(12) United States Patent
Rose et al.

(10) Patent No.: US 12,523,089 B2
(45) Date of Patent: Jan. 13, 2026

(54) AEROGEL MOLDING AND HANDLING TECHNOLOGY, MULTIPLE-PANE INSULATING GLAZING UNITS INCORPORATING AEROGEL, AND IG UNIT MANUFACTURING METHODS

(71) Applicant: Cardinal CG Company, Eden Prairie, MN (US)

(72) Inventors: Megan E. Rose, Middleton, WI (US); Kari B. Myli, Sauk City, WI (US); Keith James Burrows, Mineral Point, WI (US)

(73) Assignee: Cardinal CG Company, Eden Prairie, MN (US)

( * ) Notice: Subject to any disclaimer, the term of this patent is extended or adjusted under 35 U.S.C. 154(b) by 254 days.

(21) Appl. No.: 18/416,423

(22) Filed: Jan. 18, 2024

(65) Prior Publication Data
US 2024/0247537 A1    Jul. 25, 2024

Related U.S. Application Data

(60) Provisional application No. 63/480,715, filed on Jan. 20, 2023.

(51) Int. Cl.
*E06B 3/673* (2006.01)
*B29C 39/04* (2006.01)
(Continued)

(52) U.S. Cl.
CPC ........ *E06B 3/67365* (2013.01); *E06B 3/6715* (2013.01); *B29C 39/04* (2013.01);
(Continued)

(58) Field of Classification Search
CPC ......... B29C 39/04; B29C 39/06; B29C 41/02; B29C 41/12; B29C 41/42; B29C 39/36;
(Continued)

(56) References Cited

U.S. PATENT DOCUMENTS

| 2,525,717 A | 10/1950 | Ottenheimer |
| 2,539,079 A | 1/1951 | Holland |

(Continued)

FOREIGN PATENT DOCUMENTS

| AU | 688208 B2 | 3/1998 |
| CN | 102180603 A | 9/2011 |

(Continued)

OTHER PUBLICATIONS

Aulin et al., "Aerogels from nanofibrillated cellulose with tunable oleophobicity", Soft Matter, 2010, 6, Published May 14, 2010, pp. 3298-3305.

(Continued)

*Primary Examiner* — Carson Gross
(74) *Attorney, Agent, or Firm* — Fredrikson & Byron, P.A.

(57) ABSTRACT

In some embodiments, the invention provides a multiple-pane insulating glazing unit having a between-pane space. An aerogel layer is located in the between-pane space. Further, some embodiments of the invention provide a method of manufacturing such a multiple-pane insulating glazing unit. Still further, some embodiments provide a glazing assembly comprising a frame and a multiple-pane insulating glazing unit that includes an aerogel layer and is mounted in the frame. Finally, some embodiments provide a method of handling an aerogel sheet.

12 Claims, 19 Drawing Sheets

(51) Int. Cl.
  *B29C 39/36* (2006.01)
  *B29C 41/12* (2006.01)
  *B29C 41/42* (2006.01)
  *E06B 3/67* (2006.01)

(52) U.S. Cl.
  CPC .............. *B29C 39/36* (2013.01); *B29C 41/12* (2013.01); *B29C 41/42* (2013.01); *E06B 3/67382* (2013.01)

(58) Field of Classification Search
  CPC ......... B29C 33/34; E06B 3/673–67326; E06B 3/67382; E06B 3/67365–67386
  USPC .......................... 264/212, 299, 334; 156/109
  See application file for complete search history.

(56) References Cited

U.S. PATENT DOCUMENTS

| | | |
|---|---|---|
| 2,708,774 A | 5/1955 | Seelen |
| 2,838,810 A | 6/1958 | Englehart et al. |
| 3,105,274 A | 10/1963 | Amstrong |
| 3,226,903 A | 1/1966 | Lillethun |
| 3,261,139 A | 7/1966 | Bond |
| 3,280,523 A | 10/1966 | Stroud et al. |
| 3,389,522 A | 6/1968 | Hordis |
| 3,438,166 A | 4/1969 | Bakke |
| 3,442,059 A | 5/1969 | Kessler |
| 3,524,920 A | 8/1970 | Stromquist et al. |
| 3,672,833 A | 6/1972 | Teichner et al. |
| 3,710,074 A | 1/1973 | Stewart |
| 3,775,914 A | 12/1973 | Patil |
| 3,880,297 A | 4/1975 | Martin |
| 3,889,434 A | 6/1975 | Shelver |
| 3,940,898 A | 3/1976 | Kaufman |
| 3,941,370 A | 3/1976 | Martin et al. |
| 3,941,371 A | 3/1976 | Martin |
| 3,974,822 A | 8/1976 | Patil |
| 3,976,237 A | 8/1976 | Bossons |
| 3,990,201 A | 11/1976 | Falbel |
| 4,015,394 A | 4/1977 | Kessler |
| 4,069,630 A | 1/1978 | Chess et al. |
| 4,424,653 A | 1/1984 | Heinen |
| 4,432,956 A | 2/1984 | Zarzycki et al. |
| 4,786,344 A | 11/1988 | Beuther |
| 4,817,351 A | 4/1989 | Michlovic |
| 4,848,875 A | 7/1989 | Baughman et al. |
| 4,863,340 A | 9/1989 | Masunaga et al. |
| 4,913,049 A | 4/1990 | Sainio |
| 4,928,448 A | 5/1990 | Phillip |
| 5,056,431 A | 10/1991 | Sainio |
| 5,092,101 A | 3/1992 | Kunert |
| 5,107,655 A | 4/1992 | Lindgren |
| 5,118,543 A | 6/1992 | Mccoll |
| 5,124,185 A | 6/1992 | Kerr et al. |
| 5,154,953 A | 10/1992 | De Moncuit et al. |
| 5,197,242 A | 3/1993 | Baughman et al. |
| 5,242,647 A | 9/1993 | Poco |
| 5,275,796 A | 1/1994 | Tillotson et al. |
| 5,294,480 A | 3/1994 | Mielke et al. |
| 5,565,142 A | 10/1996 | Deshpande et al. |
| 5,683,784 A | 11/1997 | Nakao et al. |
| 5,719,705 A | 2/1998 | Machol |
| 5,744,215 A | 4/1998 | Neuman |
| 5,775,623 A | 7/1998 | Long |
| 5,795,557 A | 8/1998 | Pajonk et al. |
| 5,973,015 A * | 10/1999 | Coronado ............ B01J 13/0091 521/64 |
| 6,080,470 A | 6/2000 | Dorfman |
| 6,122,935 A | 9/2000 | Glodis et al. |
| 6,167,834 B1 | 1/2001 | Wang et al. |
| 6,235,652 B1 | 5/2001 | Cook et al. |
| 6,401,428 B1 | 6/2002 | Glover et al. |
| 6,627,305 B1 | 9/2003 | Deane et al. |
| 6,656,527 B1 | 12/2003 | Gessner et al. |
| 6,670,402 B1 | 12/2003 | Lee et al. |
| 6,740,416 B1 | 5/2004 | Yokogawa et al. |
| 6,818,309 B1 | 11/2004 | Talpaert et al. |
| 6,922,324 B1 | 7/2005 | Horwitz |
| 7,001,568 B2 | 2/2006 | Wang et al. |
| 7,078,359 B2 * | 7/2006 | Stepanian ............... B32B 15/02 501/12 |
| 7,162,841 B2 | 1/2007 | Kownacki |
| 7,543,416 B2 | 6/2009 | Albertelli |
| 7,635,411 B2 | 12/2009 | Rouanet et al. |
| 7,635,603 B2 | 12/2009 | Yang et al. |
| 7,832,177 B2 | 11/2010 | Stark |
| 7,919,158 B2 | 4/2011 | Seth et al. |
| 7,954,283 B1 | 6/2011 | Tinianov |
| 8,021,583 B2 | 9/2011 | Rouanet et al. |
| 8,110,258 B2 | 2/2012 | Milburn |
| 8,342,588 B2 | 1/2013 | Skaradzinski |
| 8,402,716 B2 | 3/2013 | Tinianov et al. |
| 8,557,236 B2 | 10/2013 | Mccrink et al. |
| 8,557,356 B2 | 10/2013 | Colson |
| 8,564,926 B2 | 10/2013 | Prahlad et al. |
| 8,844,218 B2 | 9/2014 | Showers |
| 8,915,032 B1 | 12/2014 | Rivera et al. |
| 9,068,346 B1 | 6/2015 | Lu et al. |
| 9,096,031 B2 | 8/2015 | Showers |
| 9,120,634 B1 | 9/2015 | Muir et al. |
| 9,169,687 B2 | 10/2015 | Schreiber et al. |
| 9,272,942 B2 | 3/2016 | Trommer et al. |
| 9,327,460 B2 | 5/2016 | Biver et al. |
| 9,481,603 B2 | 11/2016 | Reymond et al. |
| 9,487,438 B2 | 11/2016 | Cording et al. |
| 9,515,217 B2 | 12/2016 | Moslehi et al. |
| 9,546,513 B2 | 1/2017 | Stark et al. |
| 9,583,651 B2 | 2/2017 | Moslehi et al. |
| 9,739,085 B2 | 8/2017 | Kuster et al. |
| 9,790,396 B2 | 10/2017 | Klun et al. |
| 9,834,930 B2 | 12/2017 | Braun et al. |
| 9,869,422 B2 | 1/2018 | Shen et al. |
| 9,897,332 B2 | 2/2018 | Glover et al. |
| 9,903,549 B2 | 2/2018 | Padiyath et al. |
| 9,969,131 B2 | 5/2018 | Samak Sangari et al. |
| 9,987,755 B2 | 6/2018 | Prahlad et al. |
| 9,997,657 B2 | 6/2018 | Weigel et al. |
| 10,256,432 B2 | 4/2019 | Kajikawa et al. |
| 10,267,084 B2 | 4/2019 | Weinryb et al. |
| 10,301,868 B2 | 5/2019 | Kuster et al. |
| 10,377,583 B2 | 8/2019 | Strass |
| 10,464,760 B2 | 11/2019 | Herfert |
| 10,466,390 B2 | 11/2019 | Kobori |
| 10,626,224 B2 | 4/2020 | Chintapalli et al. |
| 10,787,586 B2 | 9/2020 | Simpson |
| 10,801,255 B2 | 10/2020 | Hermens et al. |
| 10,991,844 B2 | 4/2021 | Gislon et al. |
| 11,094,573 B2 | 8/2021 | Qiao et al. |
| 11,117,774 B2 | 9/2021 | Tanchak et al. |
| 11,155,690 B2 | 10/2021 | Dufour et al. |
| 11,286,167 B2 | 3/2022 | Xiang |
| 11,346,149 B2 | 5/2022 | Neander et al. |
| 11,466,508 B2 | 10/2022 | Sala et al. |
| 11,640,905 B2 | 5/2023 | Aydin et al. |
| 12,115,599 B2 | 10/2024 | Jetter et al. |
| 12,187,869 B2 | 1/2025 | Duong et al. |
| 2002/0102674 A1 | 8/2002 | Anderson |
| 2005/0175852 A1 | 8/2005 | Okudera et al. |
| 2006/0081004 A1 | 4/2006 | Ishikawa et al. |
| 2008/0258065 A1 | 10/2008 | Banks |
| 2011/0120031 A1 | 5/2011 | Scherba |
| 2012/0128958 A1 | 5/2012 | Zeng et al. |
| 2013/0136664 A1 | 5/2013 | Bono et al. |
| 2013/0164883 A1 | 6/2013 | Moslehi et al. |
| 2013/0170218 A1 | 7/2013 | Mazurek et al. |
| 2013/0202890 A1 | 8/2013 | Kong et al. |
| 2014/0065329 A1 | 3/2014 | Showers |
| 2014/0287641 A1 * | 9/2014 | Steiner, III ................ B32B 5/26 428/317.1 |
| 2015/0004087 A1 | 1/2015 | Zettl et al. |
| 2016/0160557 A1 | 6/2016 | Kim et al. |
| 2016/0318190 A1 | 11/2016 | Prahlad et al. |
| 2016/0319588 A1 * | 11/2016 | Samanta ............... C01B 33/159 |
| 2017/0321473 A1 | 11/2017 | Frank et al. |

(56) References Cited

U.S. PATENT DOCUMENTS

| | | |
|---|---|---|
| 2018/0245205 A1 | 8/2018 | Salomon et al. |
| 2018/0264784 A1 | 9/2018 | Murofushi et al. |
| 2019/0013746 A1 | 1/2019 | Heinz |
| 2019/0225498 A1 | 7/2019 | Ruiz et al. |
| 2019/0322084 A1 | 10/2019 | Yoshida et al. |
| 2019/0333490 A1 | 10/2019 | Wang et al. |
| 2020/0010328 A1 | 1/2020 | Kim et al. |
| 2020/0056422 A1 | 2/2020 | Kuster et al. |
| 2020/0061962 A1 | 2/2020 | Yoshida et al. |
| 2020/0324451 A1 | 10/2020 | Kuster et al. |
| 2021/0041694 A1 | 2/2021 | Chang et al. |
| 2021/0115214 A1 | 4/2021 | Ejaz et al. |
| 2022/0009786 A1 | 1/2022 | Hintemann et al. |
| 2022/0042370 A1 | 2/2022 | Burrows |
| 2022/0186550 A1 | 6/2022 | Fleury et al. |
| 2023/0050347 A1 | 2/2023 | Kitzman et al. |
| 2023/0398515 A1 | 12/2023 | Konstas et al. |
| 2024/0337950 A1 | 10/2024 | Kunze et al. |

FOREIGN PATENT DOCUMENTS

| | | |
|---|---|---|
| CN | 202706291 U | 1/2013 |
| CN | 204056721 U | 12/2014 |
| CN | 104898295 A | 9/2015 |
| CN | 105201355 A | 12/2015 |
| CN | 204936377 U | 1/2016 |
| CN | 105314268 A | 2/2016 |
| CN | 205117117 U | 3/2016 |
| CN | 205117118 U | 3/2016 |
| CN | 106082697 A | 11/2016 |
| CN | 205736249 U | 11/2016 |
| CN | 206589417 U | 10/2017 |
| CN | 206983435 U | 2/2018 |
| CN | 207190441 U | 4/2018 |
| CN | 208119841 U | 11/2018 |
| CN | 208897761 U | 5/2019 |
| CN | 113086426 A | 7/2021 |
| CN | 115649650 A | 1/2023 |
| CN | 219238556 U | 6/2023 |
| DE | 2262040 A1 | 6/1974 |
| EP | 1414266 A2 | 4/2004 |
| EP | 3112773 A1 | 1/2017 |
| GB | 1591064 A | 6/1981 |
| GB | 2241468 A | 9/1991 |
| GB | 2261247 A | 5/1993 |
| JP | 2019127357 A | 8/2019 |
| KR | 101972715 B1 | 4/2019 |
| WO | 2008110988 A2 | 9/2008 |
| WO | 2015071217 A1 | 5/2015 |
| WO | 2017090686 A1 | 6/2017 |
| WO | 2017147463 A1 | 8/2017 |
| WO | 2018034573 A1 | 2/2018 |
| WO | 2018129272 A1 | 7/2018 |
| WO | 2019153011 A1 | 8/2019 |
| WO | 2022031529 A1 | 2/2022 |
| WO | 2022031536 A1 | 2/2022 |
| WO | 2022268690 A1 | 12/2022 |
| WO | 2024080239 A1 | 4/2024 |
| WO | 2024155802 A1 | 7/2024 |
| WO | 2025024450 A1 | 1/2025 |

OTHER PUBLICATIONS

Casu et al., "Textural characterization of high temperature silica aerogels", Journal of Non-Crystalline Solids, 315, Published 2003, pp. 97-106.

Joshi et al., "Enhancement Studies on Manufacturing and Properties of Novel Silica Aerogel Composites", Gels 2018, 4, 5, Published Jan. 7, 2018, pp. 1-13.

Kazuya et al., "Dynamical transition of heat transport in a physical gel near the sol-gel transition", Scientific Reports, Published Dec. 22, 2015, pp. 7.

Pleass, "Some Physical Conditions affecting the Setting of Gelatin and the Bearing of the Results on the Theory of Gel Formation", Proceedings of the Royal Society of London, Series A, Containing Papers of a Mathematical and Physical Character, vol. 126, No. 802, Feb. 3, 1930, pp. 406-426.

Amonette et al., "Functionalized Silica Aerogels for Gas-Phase Purification, Sensing, and Catalysis: A Review", Microporous and Mesoporous Materials, Published: Apr. 27, 2017, pp. 49.

Cai et al., "Cellulose-Silica Nanocomposite Aerogels by In Situ Formation of Silica in Cellulose Gel", Angew. Chem. 2012, 124, pp. 2118-2121.

Cerion Nanomaterials, "Precisely Engineered Nanomaterials Developed Specifically for Your Product", downloaded: https://cerionnano.com/materials-b/, 2021, pp. 4.

Demilecamps et al., "Cellulose-Silica Aerogels", Carbohydrate Polymers 122, Published: Jan. 16, 2015, pp. 293-300.

Demilecamps, "Synthesis and Characterization of Polysaccharide-Silica Composite Aerogels for Thermal Superinsulation", Hal Archives-Ouvertes, Published: Feb. 26, 2016, pp. 223.

Feng et al., "Silica-Cellulose Hybrid Aerogels for Thermal and Acoustic Insulation Applications", Colloids and Surfaces A: Physicochemistry Engineering Aspects 506, Published Jun. 27, 2016, pp. 298-305.

He et al., "Aerogels From Quaternary Ammonium-Functionalized Cellulose Nanofibers for Rapid Removal of CR(VI) From Water", Carbohydrate Polymers 111 (2014), pp. 683-687.

Jiang et al., "Cellulose Nanofibril (CNF) Based Aerogels Prepared by a Facile Process and The Investigation of Thermal Insulation Performance", Cellulose 27, Jan. 25, 2020, pp. 6217-6233.

Khalil et al., "A Review on Plant Cellulose Nanofibre-Based Aerogels for Biomedical Applications", Polymers 2020, 12, 1759; DOI: 10.3390/POLYM12081759, Aug. 6, 2020, pp. 26.

Long et al., "Cellulose Aerogels: Synthesis, Applications, and Prospects", Polymers 2018, 10, 623; DOI: 10.3390/POLYM10060623, pp. 28.

Maleki et al., "An Overview on Silica Aerogels Synthesis and Different Mechanical Reinforcing Strategies", Journal of Noncrystalline Solids 385, (2014), pp. 55-74.

Nita et al., "New Trends in Bio-Based Aerogels", Pharmaceutics 2020, 12, 449; DOI: 10.3390/Pharmaceutic S12050449, May 13, 2020, pp. 31.

Padmanabhan et al., "Stiff and Tough Hydrophobic Cellulose-Silica Aerogels From Bacterial Cellulose and Fumed Silica", Process Biochemistry 103, Published: Feb. 14, 2021, pp. 31-38.

Sai et al., "Cellulose-Silica Composite Aerogels Prepared With Sodium Silicate by Freeze Drying Method", Key Engineering Materials; vol. 697, Published: Jul. 4, 2016, pp. 129-133.

International Searching Authority "International Search Report and Written Opinion" From Application No. PCT/US2024/012002, mailed Jun. 24, 2024, pp. 17.

\* cited by examiner

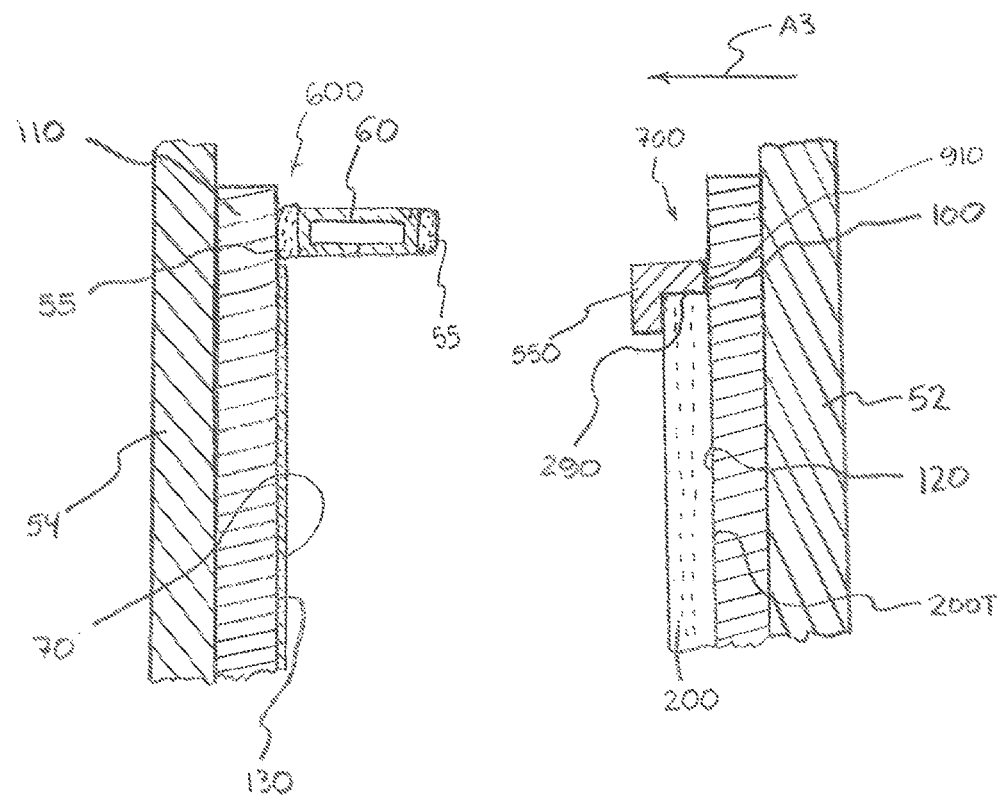
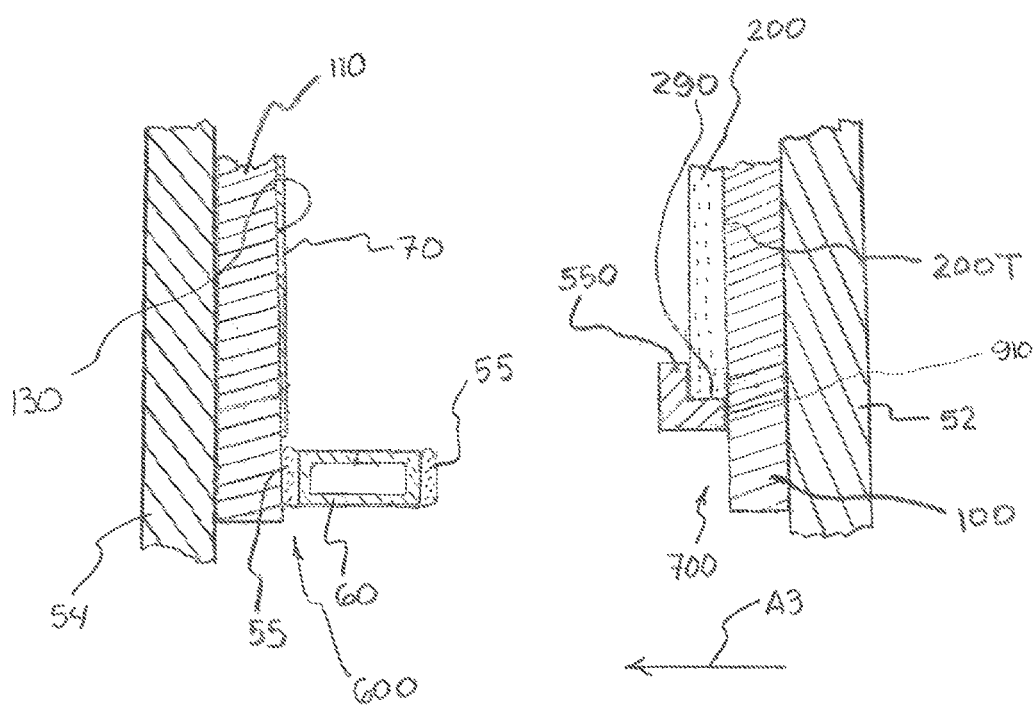
Figure 16

Figure 17
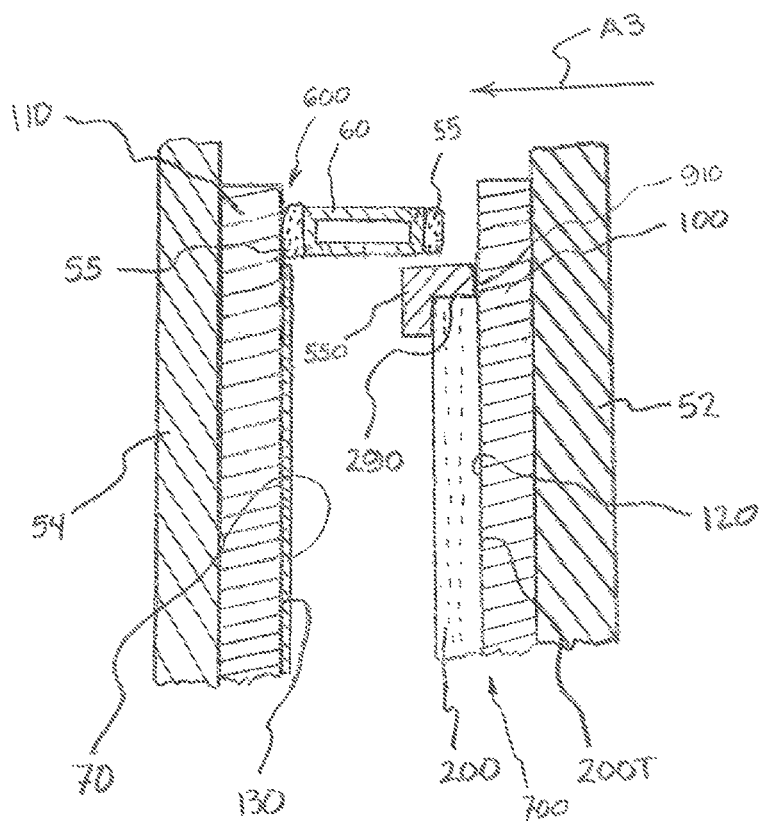
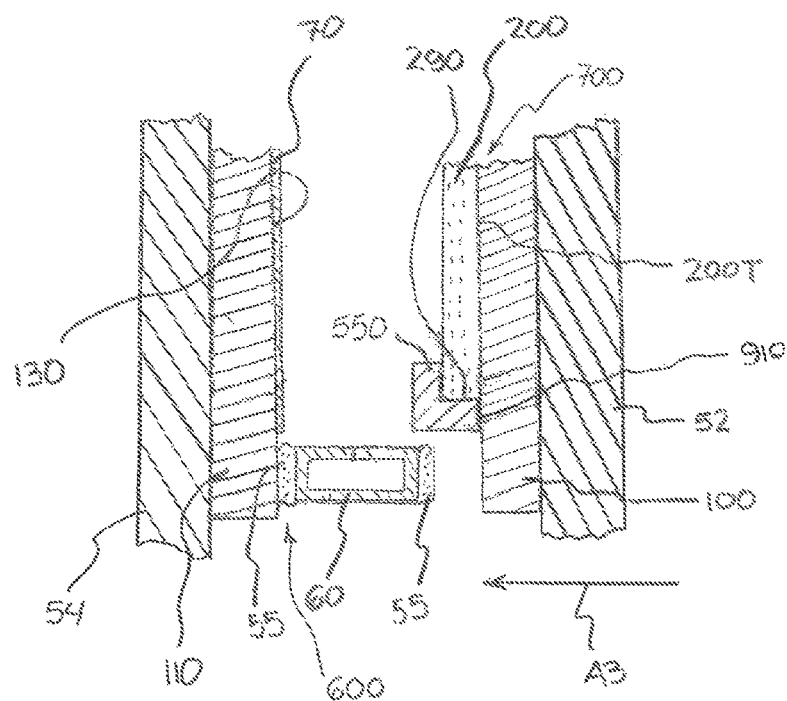

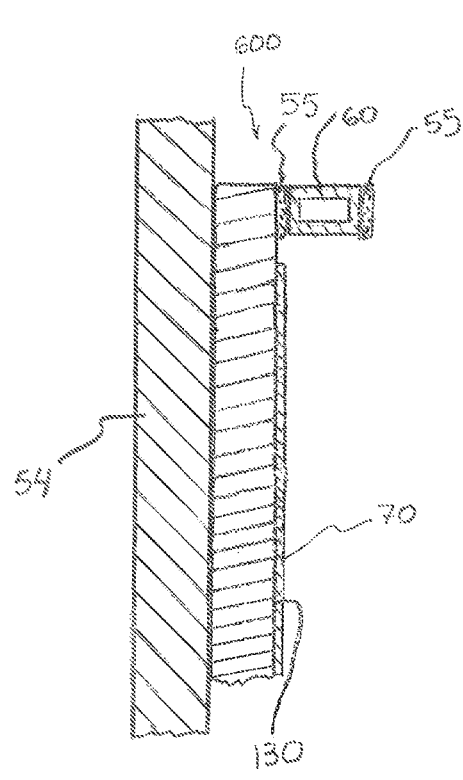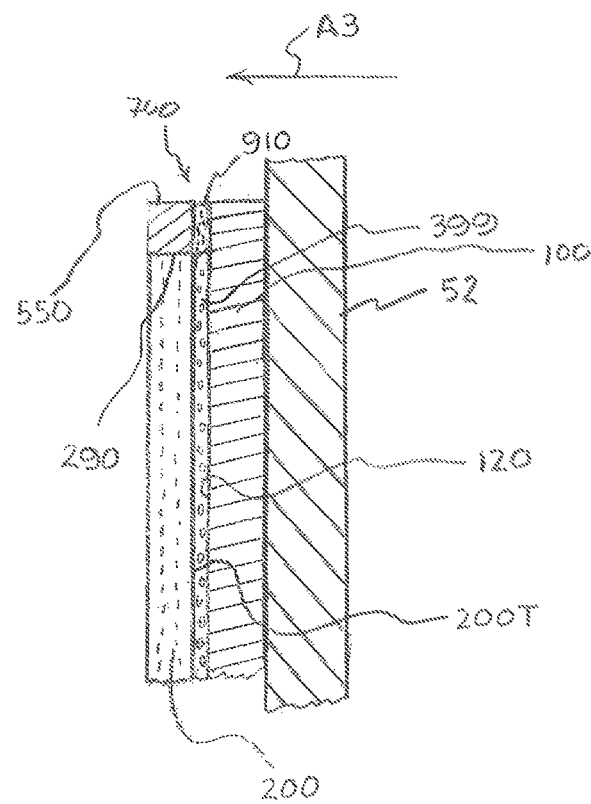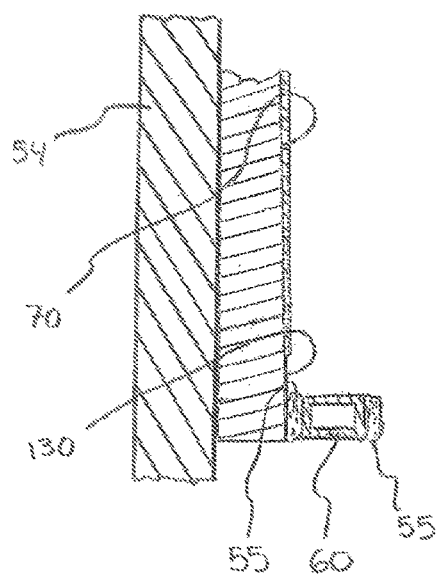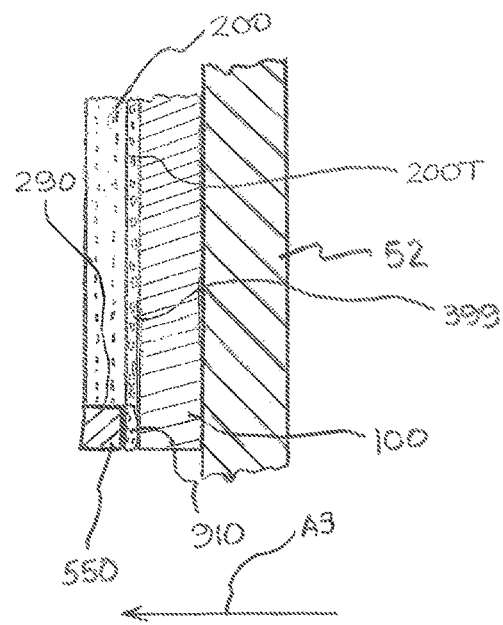
Figure 18

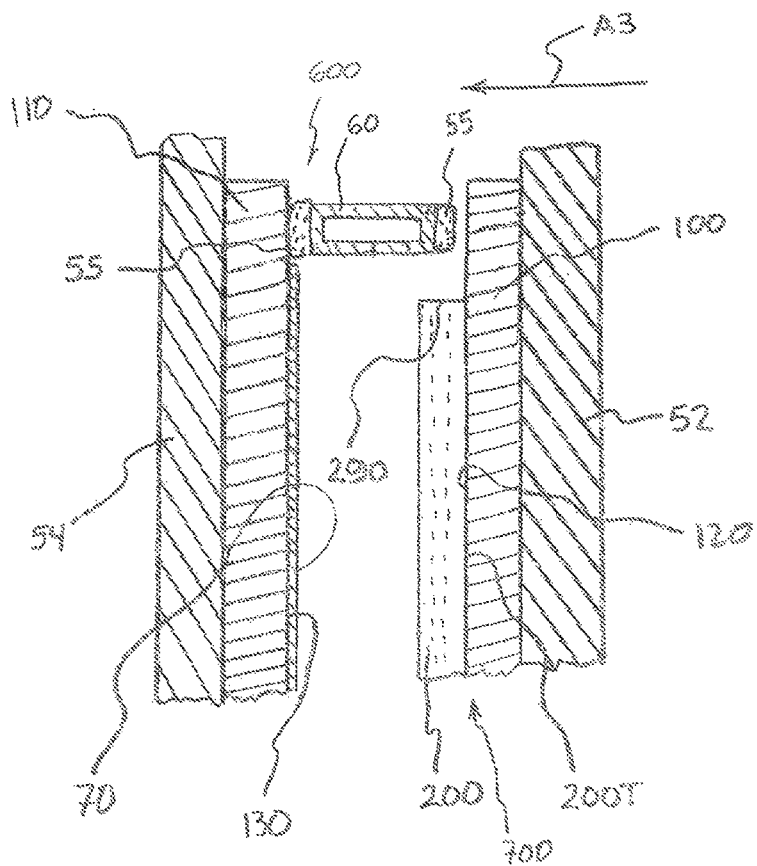
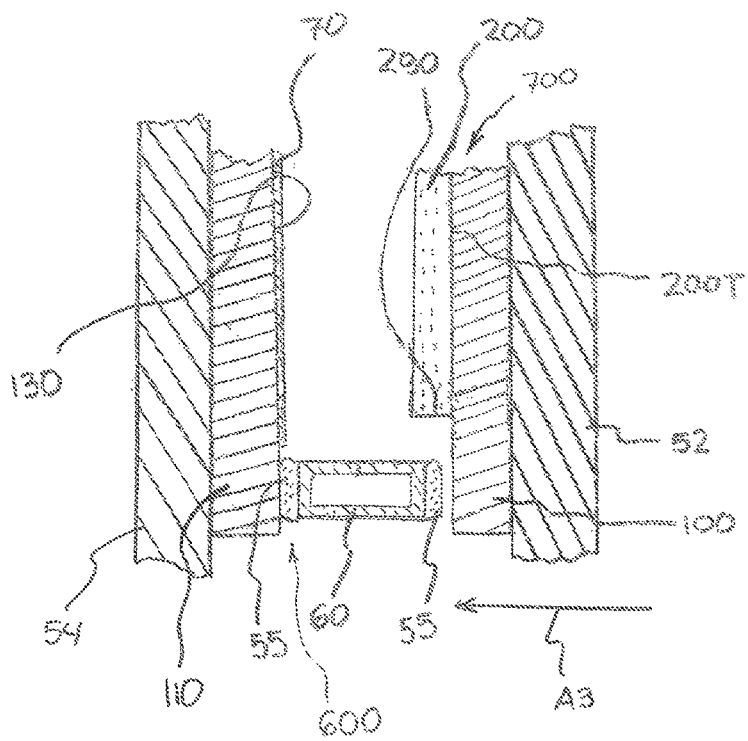
Figure 19

AEROGEL MOLDING AND HANDLING TECHNOLOGY, MULTIPLE-PANE INSULATING GLAZING UNITS INCORPORATING AEROGEL, AND IG UNIT MANUFACTURING METHODS

RELATED APPLICATIONS

This application claims priority to U.S. Provisional Patent Application No. 63/480,715, filed Jan. 20, 2023, the entire contents which are incorporated herein by reference.

FIELD OF THE INVENTION

The present invention relates to multiple-pane insulating glazing units incorporating an aerogel sheet and methods for manufacturing such IG units. The invention also relates to technology for molding and handling aerogel sheets.

BACKGROUND OF THE INVENTION

Various types of multiple-pane insulating glazing units (or "IG units") are known. Some have two panes, others have three panes. The thermal insulation properties of gas-filled triple-pane IG units tend to be greater than those of gas-filled double-pane IG units. Triple-pane IG units, however, have an overall unit width greater than that of conventional double-pane IG units. Moreover, triple-pane units tend to be heavier than double-pane units.

It would be desirable to provide double-pane IG units that are advantageously characterized by relatively narrow width and/or relatively light weight, while also providing exceptional thermal insulation properties.

Aerogel is a known insulation material. In some cases, aerogel has been provided in granular, particulate form. In other cases, aerogel has been provided in sheet form.

It would be desirable to provide IG unit constructions that advantageously incorporate aerogel sheet therein. It would also be desirable to provide methods of handling aerogel sheet while eliminating or reducing damage that may otherwise occur from handling. In addition, it would be desirable to provide methods for manufacturing IG units that include aerogel sheet.

BRIEF DESCRIPTION OF THE DRAWINGS

FIG. 16 is a schematic, broken-away, cross-sectional side view of a method of coupling together two glazing subassemblies in accordance with certain embodiments of the invention, with the two glazing assemblies shown in a first relative position;

FIG. 17 is a schematic, broken-away, cross-sectional side view of the method of FIG. 16, with the two glazing assemblies shown in a second relative position;

FIG. 18 is a schematic, broken-away, cross-sectional side view of a method of coupling together two glazing subassemblies in accordance with other embodiments of the invention; and FIG. 19 is a schematic, broken-away, cross-sectional side view of a method of coupling together two glazing subassemblies in accordance with still other embodiments of the invention.

SUMMARY OF THE INVENTION

Figure 1:
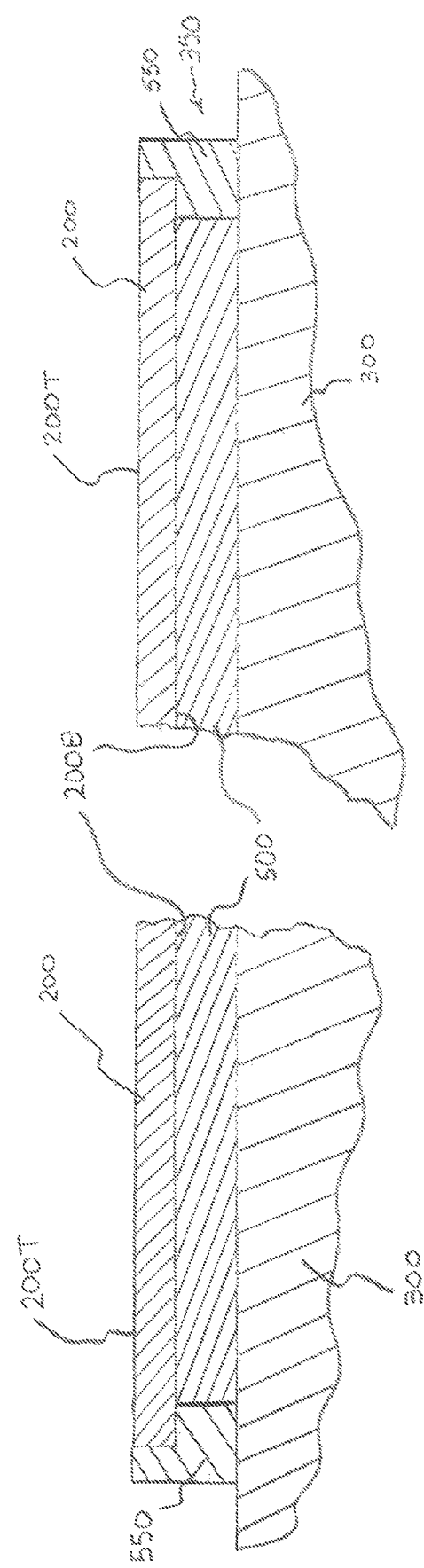
FIG. 1 is a schematic, broken-away, cross-sectional side view of an aerogel sheet in a mold in accordance with certain embodiments of the present invention.

Certain embodiments of the invention provide a multiple-pane insulating glazing unit that includes two panes, a spacer, an aerogel sheet, and a perimeter mold frame. The spacer, aerogel sheet, and perimeter mold frame are located between the two panes. The perimeter mold frame is disposed about a perimeter of the aerogel sheet. Preferably, a gas gap is located alongside the aerogel sheet.

In some embodiments, the invention provides a glazing assembly comprising a frame and a multiple-pane insulating glazing unit mounted in the frame such that a vision area is located inwardly of the frame. The multiple-pane insulating glazing unit includes two panes, a spacer, an aerogel sheet, and a perimeter mold frame. The spacer, aerogel sheet, and perimeter mold frame are located between the two panes. The perimeter mold frame is disposed about a perimeter of the aerogel sheet. Preferably, the perimeter mold frame is located outside of the vision area. Preferably, a gas gap is located alongside the aerogel sheet.

Certain embodiments of the invention provide a method of handling an aerogel sheet. The aerogel sheet initially is received in a mold that includes both a perimeter mold frame and a mold base, such that the perimeter mold frame is disposed about a perimeter of the aerogel sheet while the mold base is under a bottom side of the aerogel sheet. In the present embodiments, the method includes separating the mold base from the aerogel sheet and the perimeter mold frame and moving the aerogel sheet and the perimeter mold frame together as a subassembly. Preferably, the movement of the aerogel sheet and the perimeter mold frame together as a subassembly involves handling the subassembly by engaging the perimeter mold frame, optionally by using a gripper to grip the perimeter mold frame, without the gripper contacting the aerogel sheet. Moreover, the movement of the aerogel sheet and the perimeter mold frame together as a subassembly preferably includes placing the subassembly on a glass pane so as to bond the perimeter mold frame to a surface of the glass pane.

Some embodiments of the invention provide a method of manufacturing a multiple-pane insulating glazing unit. The method involves performing first and second subassembly operations, and thereafter performing a coupling operation. The first subassembly operation includes mounting an aerogel sheet alongside a first pane to form a first glazing subassembly. The second subassembly operation includes adhering a spacer onto a perimeter of a surface of a second pane to form a second glazing subassembly. The coupling operation includes assembling together the first and second glazing subassemblies, such that the spacer and the aerogel sheet are located between the first and second panes. In some cases, the mounting of the aerogel sheet alongside the first pane to form the first glazing subassembly includes bonding the aerogel sheet to a surface of the first pane, and the coupling operation results in there being a gas gap between the aerogel sheet and the second pane.

In certain embodiments, the invention provides a method of manufacturing a multiple-pane insulating glazing unit. The method involves performing first and second subassembly operations, and thereafter performing a coupling operation. In the present embodiments, the first subassembly operation includes placing an aerogel-frame subassembly on a first pane to form a first glazing subassembly. The second subassembly operation includes adhering a spacer onto a perimeter of a surface of a second pane to form a second glazing subassembly. The coupling operation in the present embodiments includes assembling together the first and second glazing subassemblies, such that the spacer and the aerogel-frame subassembly are located between the first and second panes. Preferably, the aerogel-frame subassembly includes an aerogel sheet and a perimeter mold frame, the perimeter mold frame is disposed about a perimeter of the aerogel sheet, and the placing of the aerogel-frame subassembly on the first pane to form the first glazing subassembly includes bonding the perimeter mold frame to a surface of the first pane. Moreover, the coupling operation preferably results in there being a gas gap between the aerogel sheet and the second pane.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Some embodiments of the invention involve handling an aerogel sheet 200. In a first group of embodiments, the aerogel sheet 200 is initially received in a mold 350. In such cases, it is to be appreciated that the aerogel sheet 200 has previously been formed (e.g., synthesized) in the mold 350. Various techniques are known for forming in a mold aerogel sheets of different compositions. Any suitable aerogel production technique can be used.

In some cases, the mold 350 includes both a perimeter mold frame 550 and a mold base 500. Reference is made to the non-limiting examples of FIGS. 1, 2, and 4. In these Figures, the perimeter mold frame 550 is disposed about (and preferably embraces, e.g., is bonded to) a perimeter of the aerogel sheet 200, while the mold base 500 is under a bottom side of the aerogel sheet. When the aerogel sheet 200 is being formed in the mold 350, the perimeter mold frame 550 preferably serves as a sidewall (or at least defines part of the sidewall) bounding the cavity or bed of the mold 350. In some cases, the perimeter mold frame 550 also defines part of a bottom wall of the mold 350. One non-limiting example is shown in FIG. 1.

Figure 4:
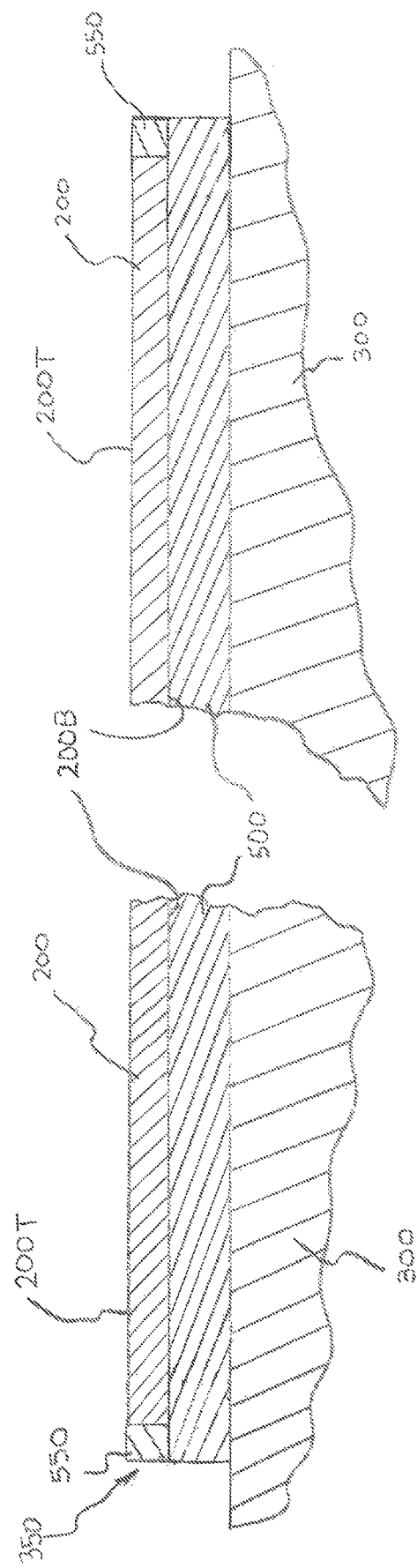
FIG. 4 is a schematic, broken-away, cross-sectional side view of an aerogel sheet in another mold in accordance with certain embodiments of the present invention.

When provided, the perimeter mold frame 550 and the mold base 500 can have different configurations. Preferably, the perimeter mold frame 550 has a thickness that is equal to or greater than the thickness of the aerogel sheet 200. In FIG. 1, the thickness of the perimeter mold frame 550 is greater than (e.g., at least 50% greater than) the thickness of the aerogel sheet 200. In FIG. 4, the thickness of the perimeter mold frame 550 is equal to, or at least substantially equal to, the thickness of the aerogel sheet 200. Preferably, the perimeter mold frame 550 has a thickness greater than 2 mm.

In the example of FIG. 1, the perimeter mold frame 550 has a generally L-shaped cross-sectional configuration. Here, the perimeter mold frame 550 defines an internal corner that receives an external corner of the aerogel sheet 200, such that the perimeter mold frame contacts both a perimeter edge of the aerogel sheet and a face (e.g., a bottom face 200B) of the aerogel sheet 200. Configurations of this nature may provide certain advantages. For example, a perimeter mold frame 550 of such configuration may be easier to handle, may provide additional support to the aerogel sheet 200 during handling, or both. Reference is made to FIG. 1.

In other cases, the thickness of the perimeter mold frame 550 is equal to, or at least substantially equal to, the thickness of the aerogel sheet 200. Configurations of this nature may also provide advantages. For example, this type of perimeter mold frame may leave an entirety of both the top 200T and bottom 200B faces of the aerogel sheet 200 exposed. This may be convenient for embodiments that include pressing the perimeter mold frame 550 and/or the aerogel sheet 200 against a pane 100, or in facilitating various other handling manipulations. It can also minimize the thickness, weight, and material requirements of the perimeter mold frame.

Figure 2:
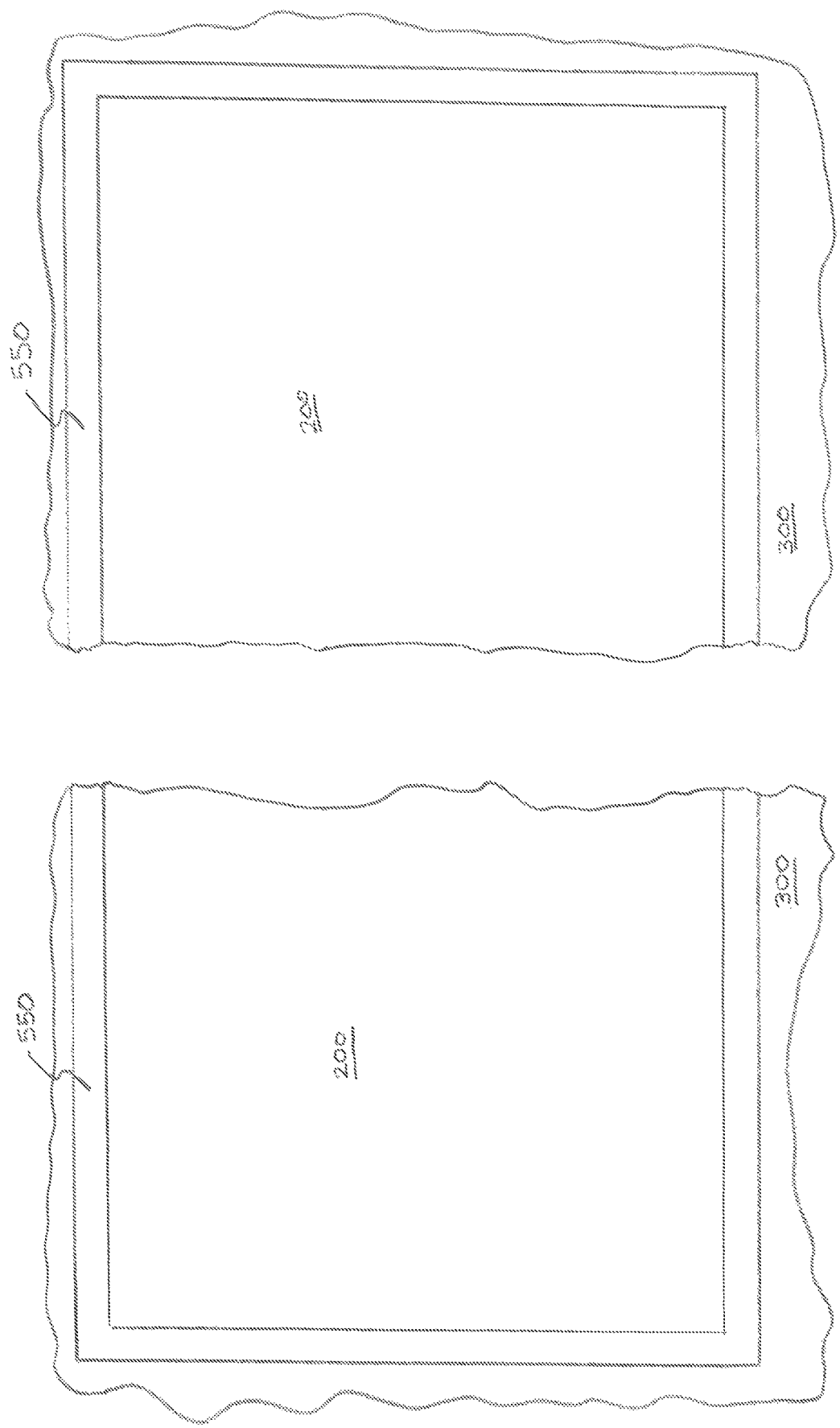
FIG. 2 is a schematic, broken-away, top view of a double-pane insulating glazing unit in accordance with other embodiments of the invention.

With continued reference to FIGS. 1, 2, and 4, the perimeter mold frame 550 and the mold base 500 collectively bound (e.g., delineate or define) a cavity or bed in which the aerogel sheet 200 is formed. Preferably, when the aerogel sheet 200 is being formed in the mold 350, the gel contacts the perimeter mold frame 550. FIG. 1 is a schematic cross-sectional image of one exemplary mold 350 having an aerogel sheet 200 received therein. FIG. 2 is a broken-away top view of the aerogel sheet 200 in the mold 350 of FIG. 1. In embodiments of this nature, the perimeter mold frame 550 and the mold base 500 are initially coupled together to collectively bound the mold cavity or bed. They can subsequently be separated from each other (e.g., by moving the perimeter mold frame 550, together with the aerogel sheet 200, away from the mold base 500).

Thus, in the present embodiments, when an aerogel sheet 200 that has been formed in the mold 350 is subsequently handled, the handling preferably includes separating the aerogel sheet and the perimeter mold frame 550 from the mold base 500 and moving the aerogel sheet and the perimeter mold frame together as a subassembly. This can be appreciated by referring to the non-limiting examples of FIGS. 3 and 5. In some cases, the initial movement of this subassembly is vertical, upward movement (e.g., in direction A1).

In FIGS. 1, 2, and 4, the mold 350 is shown mounted on a support 300. The support 300 may be a bench, table, rail, assembly line framework, base of a processing chamber, or any other support.

The perimeter mold frame 550 can be a cassette or frame formed of metal (e.g., stainless steel or aluminum), polymer, ceramic, or composite. Preferably, the material (e.g., metal) from which the perimeter mold frame 550 is formed is rigid. Thus, the perimeter mold frame 550 preferably has a rigid construction.

In many cases, the perimeter mold frame 550 will have a rectangular configuration (it can be a cassette or frame that delineates a rectangular shape). In more detail, the perimeter mold frame 550 will often comprise four leg sections and have a rectangular configuration. This is shown in the non-limiting example of FIG. 2.

Furthermore, the aerogel sheet 200 will often have a rectangular shape, as is shown in FIG. 2. It is to be appreciated, however, that the shape of the perimeter mold frame and the aerogel sheet can be varied to meet the requirements of different glazing applications; the shape will not always be rectangular.

The perimeter mold frame 550 preferably has a length of at least 0.5 meter, such as at least 1 meter, or perhaps at least 1.5 meters (e.g., between 2 meters and 4 meters), and in some cases at least 3 meters. In many embodiments, the perimeter mold frame 550 has a length of at least 0.5 meter and a width of at least 0.3 meter. Preferably, the length is at least about 1 meter while the width is at least about 0.61 meter. In some examples, the length is greater than 0.9 meter while the width is greater than 0.6 meter. Thus, the perimeter mold frame 550 can advantageously be configured for use with large-area aerogel sheets. Moreover, for any embodiment that involves the perimeter mold frame 550, its dimensions can optionally be within any one or more of the ranges noted in this paragraph. It will be appreciated, however, that other dimensions can be used to meet the requirements of different glazing applications.

The aerogel sheet 200 preferably has a length of at least 0.5 meter, such as at least 1 meter, or perhaps at least 1.5 meters (e.g., between 2 meters and 4 meters), and in some cases at least 3 meters. In many embodiments, the aerogel sheet 200 has a length of at least 0.5 meter and a width of at least 0.3 meter. Preferably, the length is at least about 1 meter while the width is at least about 0.61 meter. In some examples, the length is greater than 0.9 meter while the width is greater than 0.6 meter. Thus, the aerogel sheet 200 can advantageously be a large-area aerogel sheet. Moreover, for any embodiment, the dimensions of the aerogel sheet 200 can optionally be within any one or more of the ranges noted in this paragraph. Again, however, other dimensions can be used to meet the requirements of different glazing applications.

Figure 3:
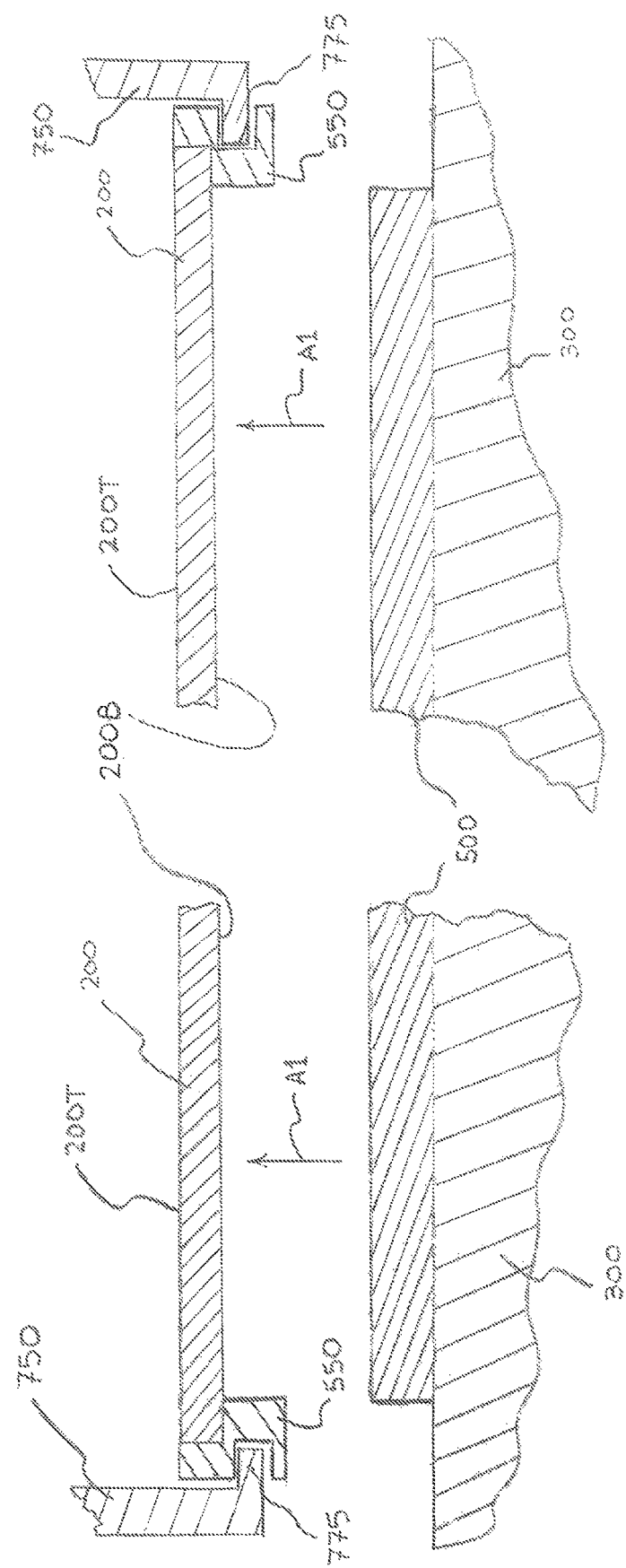
FIG. 3 is a schematic, broken-away, cross-sectional side view of the aerogel sheet of FIG. 1 being separated and moved away, together with a perimeter mold frame of the mold of FIG. 1, from a mold base of the mold of FIG. 1.
Figure 5:
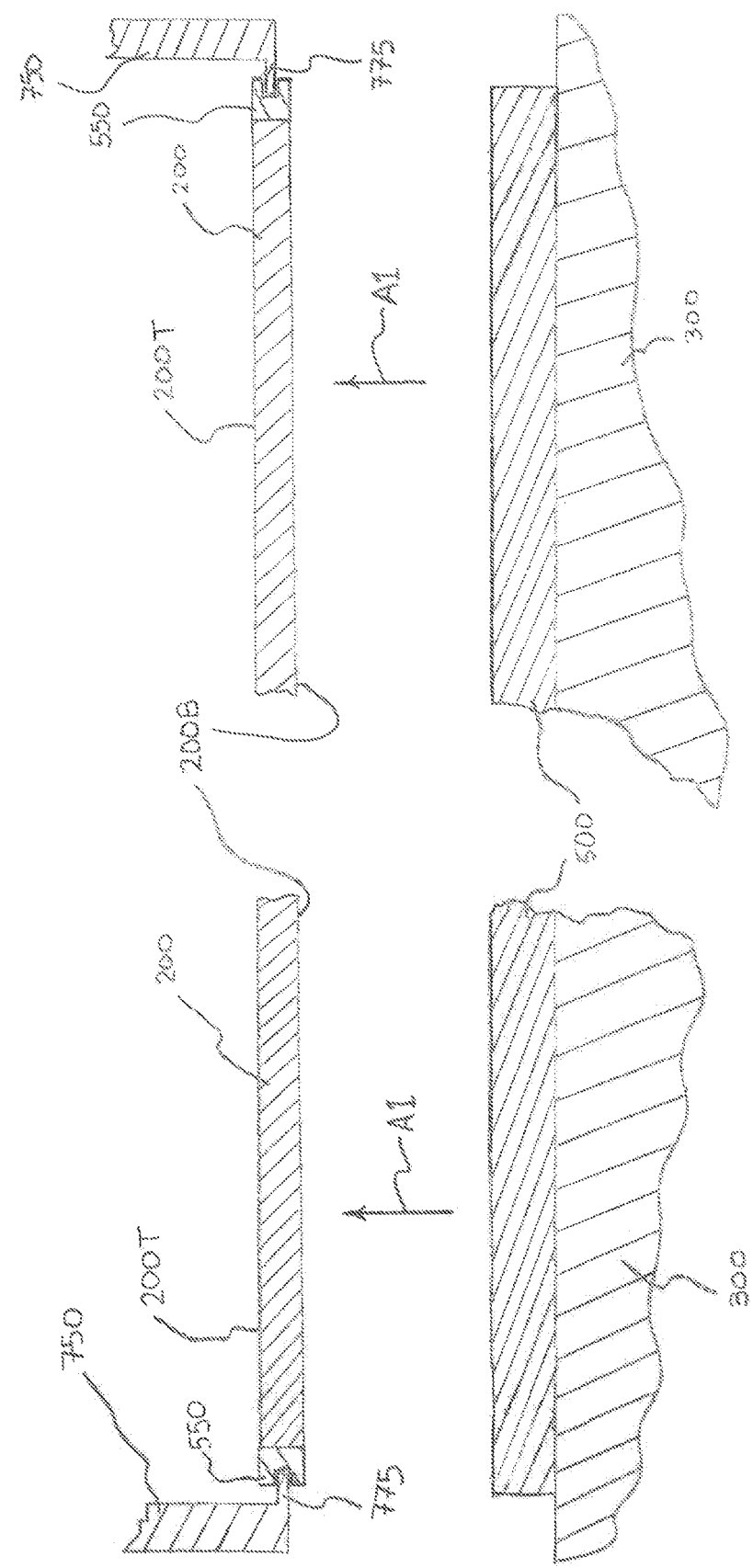
FIG. 5 is a schematic, broken-away, cross-sectional side view of the aerogel sheet of FIG. 4 being separated and moved away, together with a perimeter mold frame of the mold of FIG. 4, from a mold base of the mold of FIG. 4.

In the first group of embodiments, the step of moving the aerogel sheet 200 and the perimeter mold frame 550 together as a subassembly preferably involves handling the subassembly by engaging the perimeter mold frame. Thus, the perimeter mold frame 550 may facilitate handling the aerogel sheet 200. Two non-limiting examples are shown in FIGS. 3 and 5. While these two examples involve fingers 775 of a gripper 750 engaging slots, holes, or other recesses that can optionally be provided in the perimeter mold frame 550, it is to be appreciated that such recesses can be omitted in favor of simply handling (e.g., gripping) one or more of the outer side surface, top surface, and bottom surface of the perimeter mold frame.

In the embodiments of FIGS. 3 and 5, when moving the aerogel sheet 200 and the perimeter mold frame 550 together as a subassembly, the perimeter mold frame embraces a perimeter edge of the aerogel sheet but leaves exposed a top face 200T of the aerogel sheet and leaves exposed at least a central portion of a bottom face 200B of the aerogel sheet. In the example of FIG. 3, the perimeter mold frame 550 embraces a perimeter edge of the aerogel sheet 200 but leaves exposed the entire top face 200T of the aerogel sheet while leaving exposed only a central portion (i.e., less than an entirety) of the bottom face 200B of the aerogel sheet. In the example of FIG. 5, the perimeter mold frame 550 embraces a perimeter edge of the aerogel sheet 200 while leaving exposed the entire top face 200T and the entire bottom face 200B of the aerogel sheet.

Preferably, the engagement of the perimeter mold frame 550 involves using a gripper 750 to grip the perimeter mold frame, without the gripper contacting the aerogel sheet 200. In some cases, the perimeter mold frame 550 has four leg sections (which may collectively delineate a rectangular shape), and when the gripper 750 grips the perimeter mold frame this involves the gripper simultaneously holding (e.g., gripping or otherwise contacting) at least two of the four leg sections of the perimeter mold frame. This can be appreciated by referring to FIGS. 2, 3, and 5. In cases where the perimeter mold frame comprises four leg sections, it may be preferrable to have the gripper simultaneously hold all four leg sections during handling.

In embodiments where a gripper 750 is used, the gripper may be mounted on the working end of a robot arm. This is the case in FIGS. 9 and 10. In other embodiments involving a gripper, the gripper is mounted on an overhead gantry configured to move the gripper vertically (e.g., downwardly and upwardly, so as to move toward and away from a mold containing an aerogel sheet) and along at least one horizontal axis. In some embodiments of this nature, the overhead gantry is configured to move the gripper vertically and along two horizontal axes that are perpendicular to each other.

Another alternative is to manually move the perimeter mold frame 550 and the aerogel sheet 200 together as a subassembly. For example, one or more workers can manually lift the subassembly upwardly off the mold base 500, move the subassembly to an IG unit conveyor or assembly line, and press the subassembly against a pane on the IG unit conveyor or assembly line. One non-limiting example of an IG unit assembly line 30 is shown in FIGS. 11-14.

In embodiments involving a gripper 750 mounted on a robot arm, the robot arm preferably has multiple axes of rotation (i.e., it is a multi-axis robot arm), preferably including a vertical axis of rotation, and perhaps optimally also including a horizontal axis of rotation. In such cases, the robot arm may have four or more (e.g., six) axes of rotation. Suitable robot arms are commercially available from Fanuc of Yamanashi, Japan, for example, under model number R2000iC/165. The gripper 750 may depend from a base, head, or frame 70 (and preferably is movable to grip and subsequently release the perimeter mold frame 550). In such cases, the base, head, or frame can be carried by a robot arm, an overhead gantry, or the like.

Movement of the aerogel sheet 200 and the perimeter mold frame 550 together as a subassembly preferably includes placing the subassembly on a pane (e.g., a glass pane) 100, thereby forming a glazing subassembly. This may involve adhering (e.g., bonding) the perimeter mold frame, the aerogel sheet, or both to a surface of the pane. Preferably, this includes pressing the subassembly against the pane. Reference is made to the non-limiting examples of FIGS. 9 and 10. The resulting glazing subassembly is identified by reference number 700 in the non-limiting example of FIG. 11.

Figure 9:
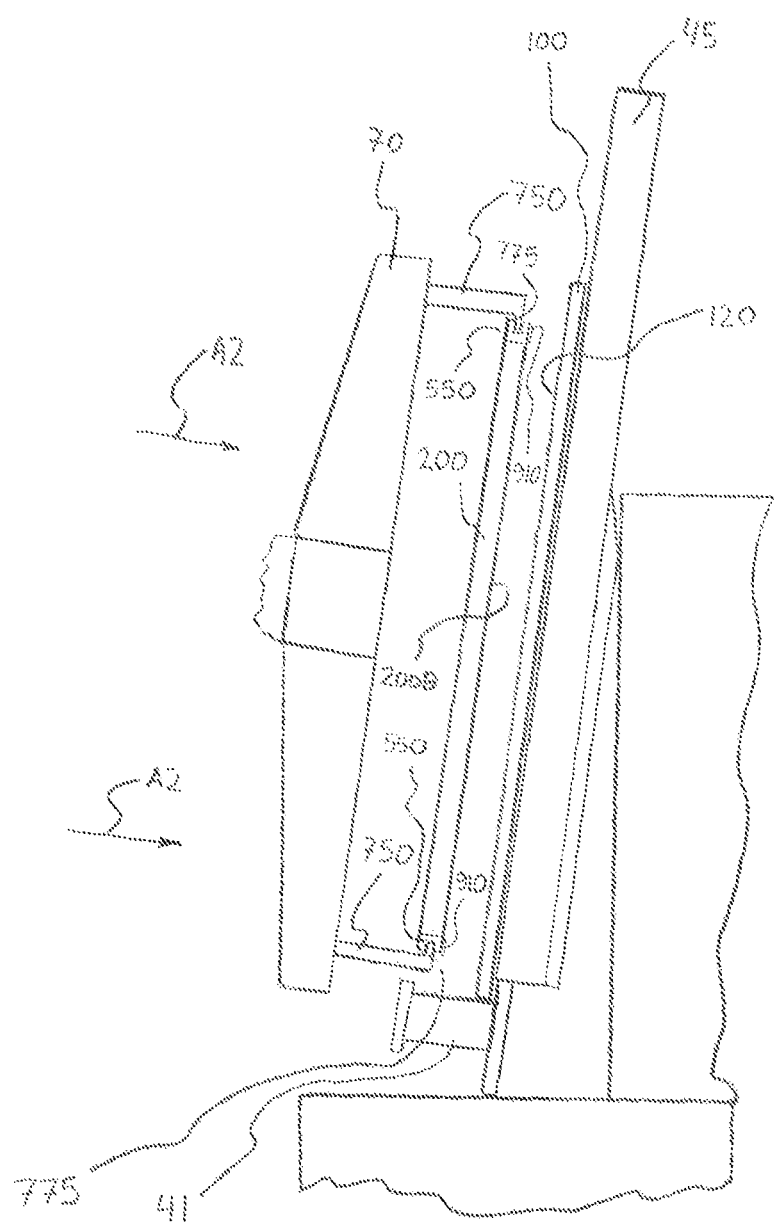
FIG. 9 is a schematic side view of a gripper carrying a perimeter mold frame that embraces an aerogel sheet in accordance with certain embodiments of the invention.
Figure 10:
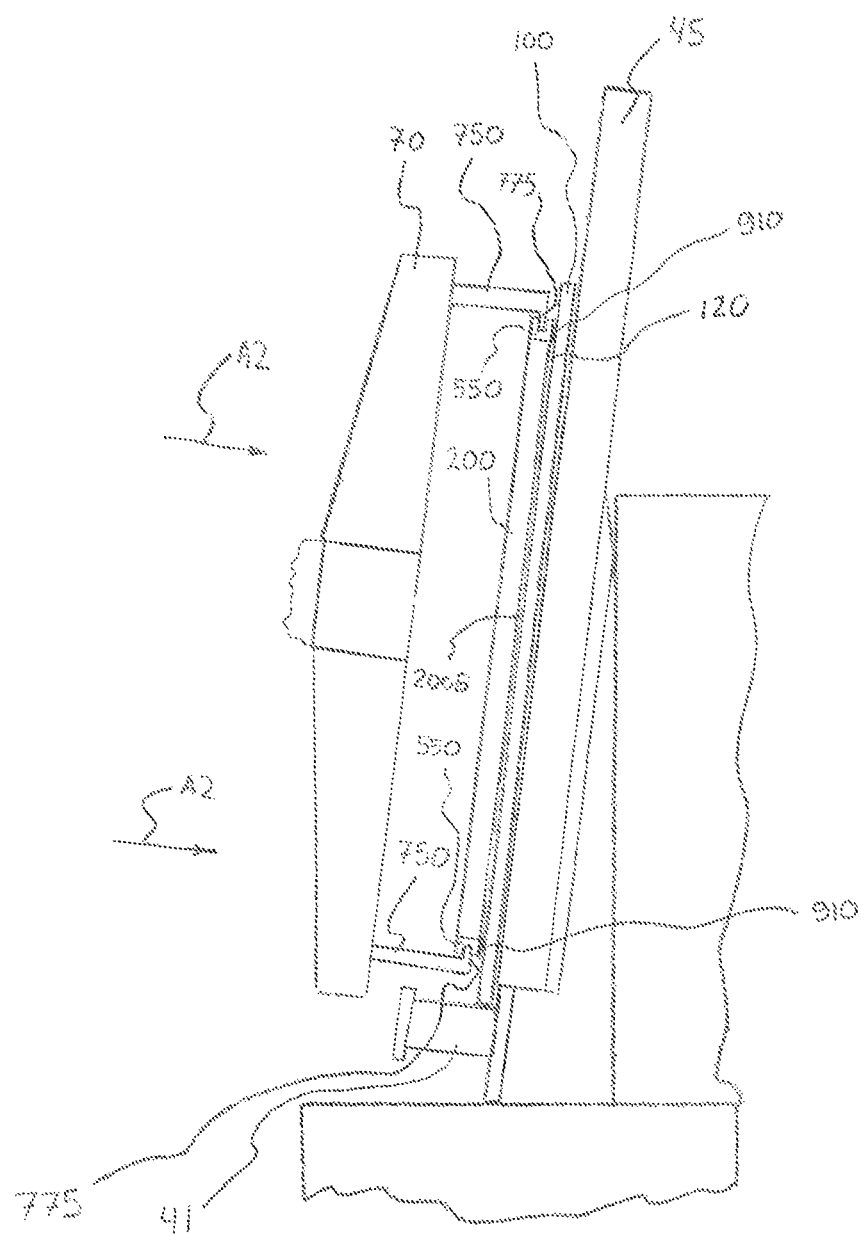
FIG. 10 is a schematic side view of the gripper of FIG. 9 shown pressing the perimeter mold frame and the aerogel sheet against a pane in accordance with certain embodiments of the invention.
Figure 11:
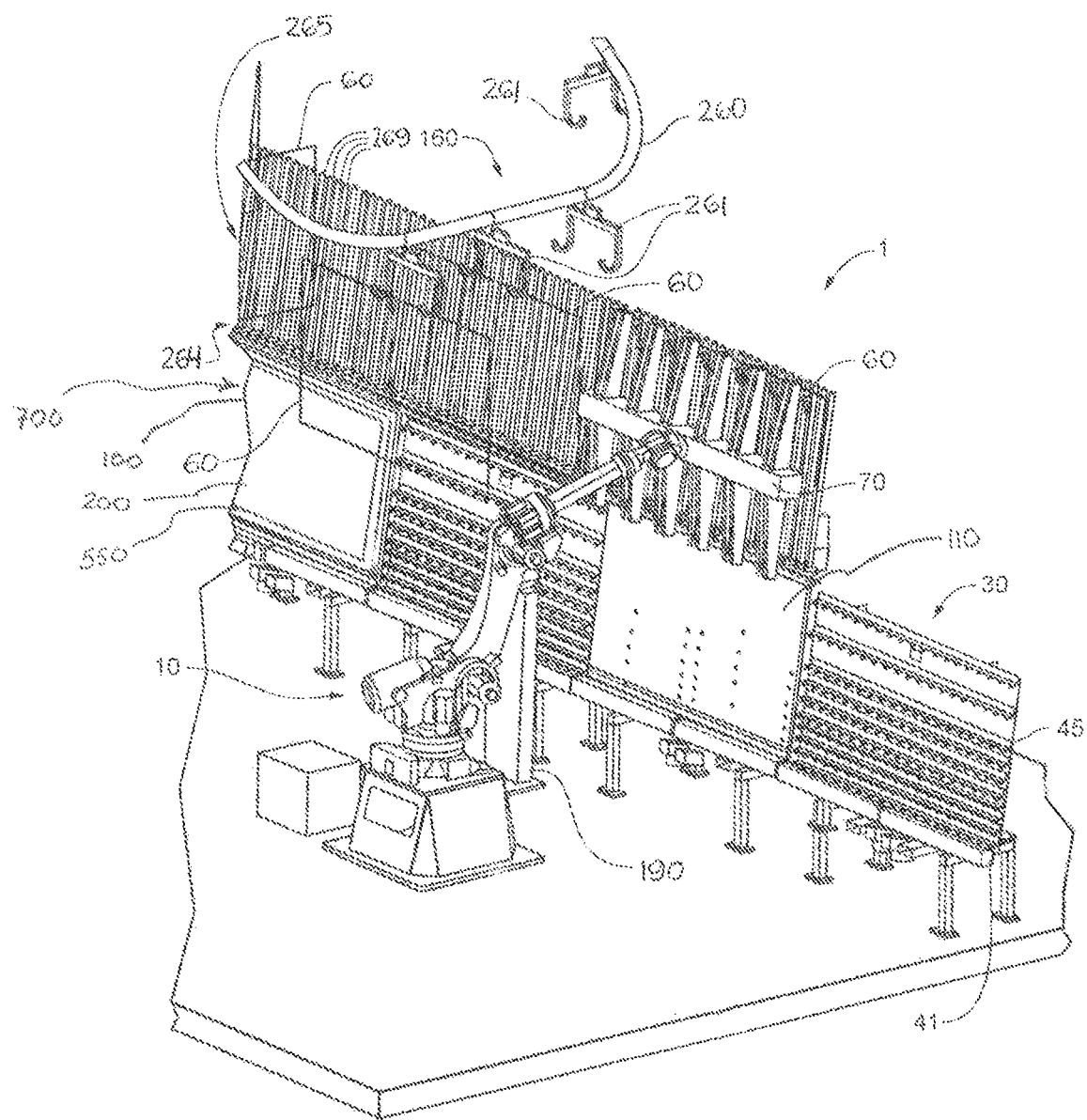
FIG. 11 is a broken-away perspective view of an assembly line in accordance with certain embodiments of the invention, including a robot arm shown picking a spacer from a spacer conveyor line of the assembly line.
Figure 12:
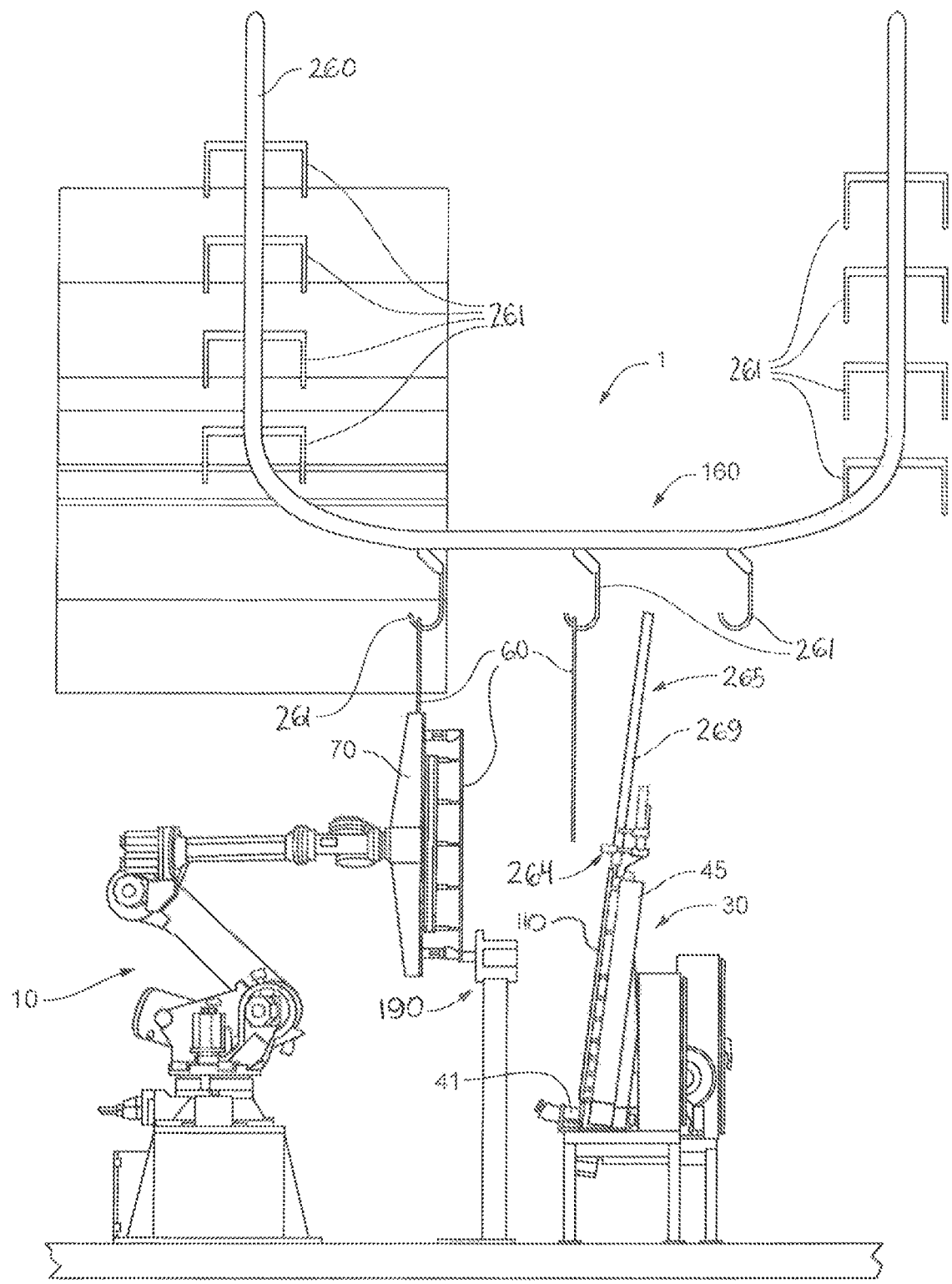
FIG. 12 is a side view of the assembly line of FIG. 11, with the robot arm shown holding the spacer in a position adjacent a sealant applicator of the assembly line in accordance with some embodiments of the invention.
Figure 13:
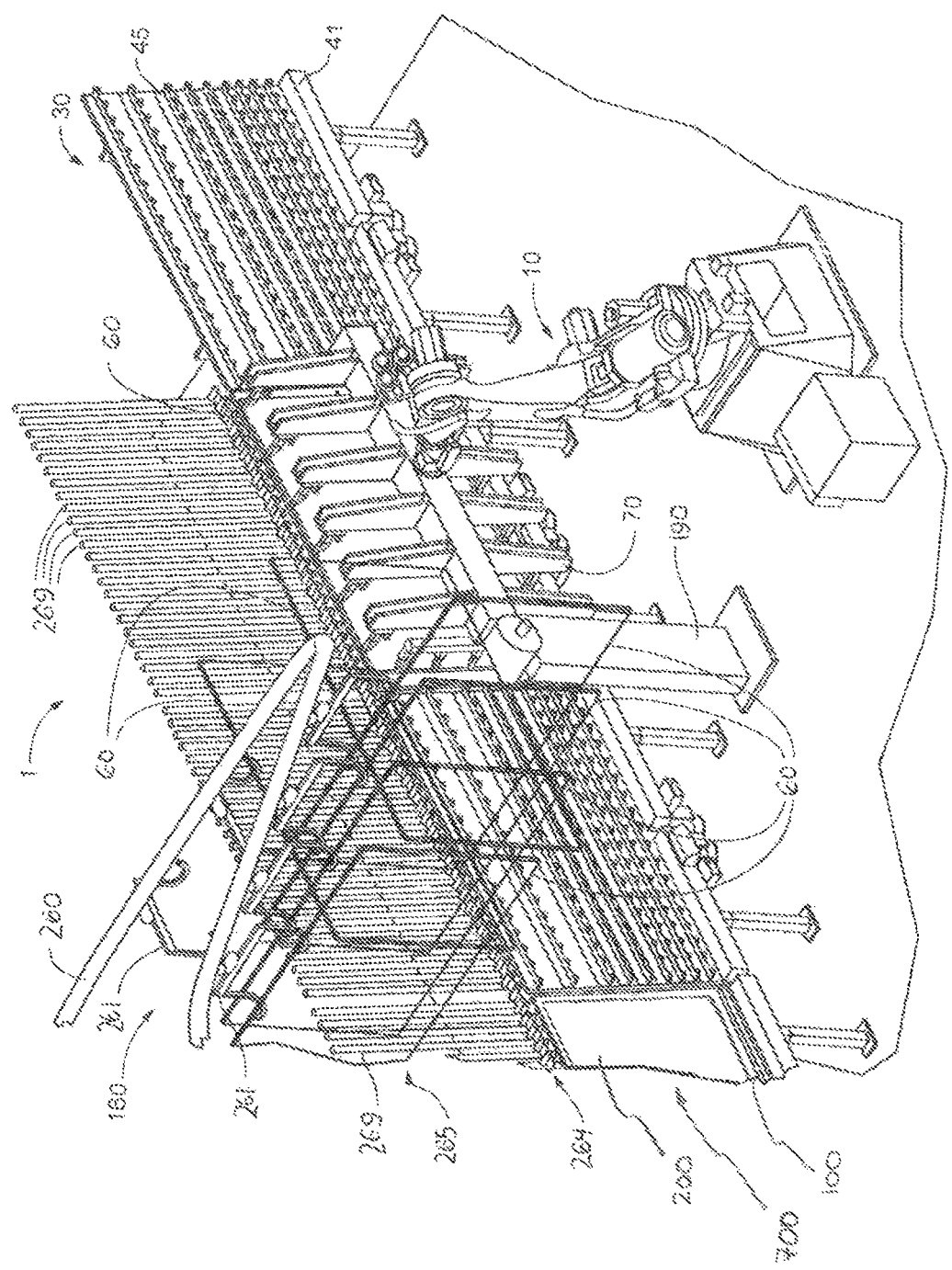
FIG. 13 is a broken-away perspective view of the assembly line of FIG. 11, with the robot arm shown applying the spacer onto a pane that is located on an IG unit conveyor of the assembly line in accordance with some embodiments of the invention.
Figure 14:
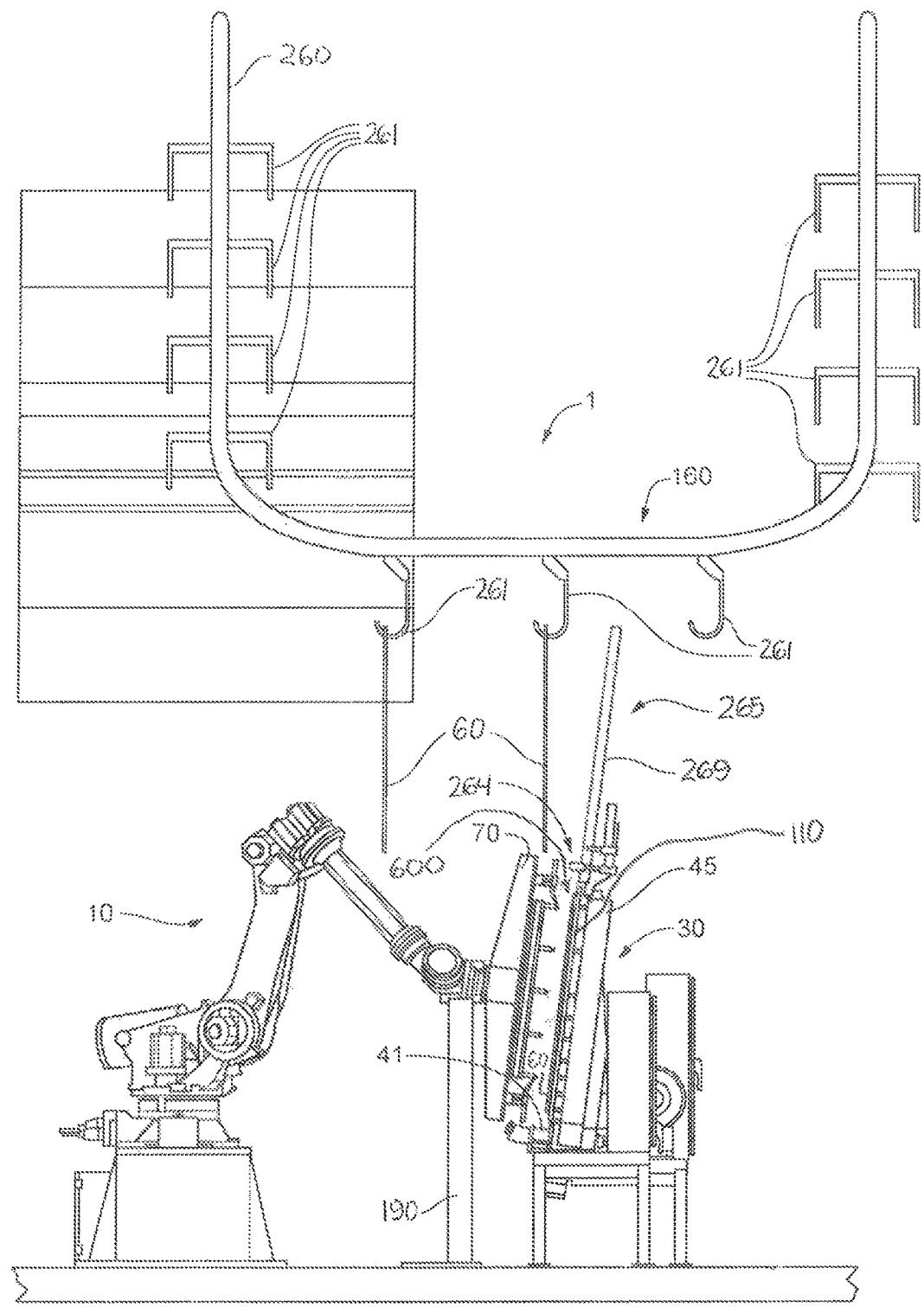
FIG. 14 is a side view of the assembly line of FIG. 11, with the robot arm shown in a retract position after having applied the spacer to the pane that is located on the IG unit conveyor of the assembly line in accordance with some embodiments of the invention.

In some embodiments, the aerogel sheet 200 is in a horizontal (or at least substantially horizontal) orientation when initially received in the mold 350, whereas the aerogel sheet is in a vertical (or at least substantially vertical) orientation when placing the subassembly on the pane. Reference is made to the non-limiting examples of FIGS. 1, 4, 9, and 10. As shown in FIGS. 9 and 10, the aerogel sheet 200 may be in a vertical offset position when placed on (e.g., pressed onto) the pane 100. In such cases, the aerogel sheet 200 when placed on the pane 100 may be in an upright, generally vertical position that is offset from vertical by a few degrees, e.g., less than 10 degrees, such as from 3-9 degrees, perhaps about 7 degrees. Thus, the movement of the aerogel sheet 200 and the perimeter mold frame 550 together as a subassembly preferably includes rotating the subassembly about at least one axis, e.g., a horizontal axis. Moreover, it can optionally include rotating the subassembly about multiple axes before pressing it onto a pane.

In the first embodiment group, the method may further include performing a coupling operation by assembling glazing subassembly 700 together with a second glazing subassembly 600 so as to form a multiple-pane insulating glazing unit 40. Preferably, the second glazing subassembly 600 includes a second pane 110 and a spacer 60. Reference is made to the non-limiting example of FIG. 14. In the resulting IG unit 40, the spacer 60, the aerogel sheet 200, and the perimeter mold frame 550 are located between the two panes 100, 110. In addition, the coupling operation preferably results in the IG unit 40 having a gas gap alongside the aerogel sheet 200. Reference is made to the non-limiting examples of FIGS. 6-8 and 15. The present coupling operation can be performed in accordance with the coupling operation description provided below relative to the third embodiment group, as well as the related drawings.

In a second group of embodiments, the invention provides a multiple-pane insulating glazing unit 40, which includes two panes 100, 110 and a between-pane space 50. The between-pane space 50 is located between the two panes 100, 110. Preferably, the multiple-pane insulating glazing unit 40 is devoid of a third pane, and there is only one between-pane space.

The multiple-pane insulating glazing unit 40 includes an aerogel sheet 200, which preferably is mounted alongside (and in some cases, is adhered to) an interior surface of one of the two panes 100, 110. The aerogel sheet 200 can consist of a single thickness of aerogel or it can comprise two or more thicknesses of aerogel. When two or more thicknesses of aerogel are used, they may be carried alongside one another, e.g., so as to form a multi-layer aerogel sheet. In such cases, the two or more thicknesses of aerogel can optionally be formed of different aerogel compositions, or they may all be formed of the same aerogel composition. If desired, the aerogel sheet can be formed by a plurality of aerogel bodies that are contiguous to one another in a side-by-side arrangement so as to collectively define the aerogel sheet. In preferred embodiments, though, the aerogel sheet 200 is a single monolithic body of aerogel that has the same composition, or at least substantially the same composition, throughout its thickness and at all areas of the sheet.

In the present second group of embodiments, the multiple-pane insulating glazing unit 40 includes a perimeter mold frame 550, which is disposed about a perimeter of the aerogel sheet 200. The perimeter mold frame 550 can be of the nature described above. The spacer 60, aerogel sheet 200, and perimeter mold frame 550 are located between the two panes 100, 110. Reference is made to the non-limiting examples of FIGS. 6-8 and 15.

In some embodiments, a gas gap is located alongside the aerogel sheet 200. The gas gap preferably contains a gaseous atmosphere, e.g., a thermally insulative gas, such as argon, krypton, or both. In some cases, the gaseous atmosphere comprises a mix of argon and air (e.g., 90% argon and 10% air). In other cases, the gaseous atmosphere comprises a mix of krypton and air. In still other cases, the gaseous atmosphere comprises a mix of argon, krypton, and air. In yet other cases, the gaseous atmosphere is just air.

In certain embodiments, the between-pane space 50 has a width of 13 mm or greater (perhaps 14 mm or greater, such as 15 mm or greater), while the gas gap has a width in a range of from 9 to 14 mm (perhaps from 10 to 14 mm, such as from 11 to 13 mm) and contains a gaseous atmosphere comprising argon, air, or both. In these embodiments, the multiple-pane insulating glazing unit 40 has additional thermal insulation from the inclusion of the aerogel sheet 200, together with the arrangement and width of the gas gap providing a sweet spot for the thermal insulation performance of such gas fills. For embodiments where the gas fill is argon or a mixture of argon and air (e.g., about 90% argon and about 10% air), the width of the between-pane space 50 can optionally be in any one or more of the three between-pane space width ranges noted above, while the width of the gas gap is in a range of from 10 to 14 mm (perhaps optimally from 11 to 13 mm). This can optionally be the case for any embodiment of the present second embodiment group. Moreover, in any embodiments described in this paragraph, the multiple-pane insulating glazing unit 10 can optionally have a thickness of less than 30 mm, less than 25 mm, less than 23 mm, or in some cases even less than 22 mm.

The multiple-pane insulating glazing unit 40 includes two panes: a first pane 100 and a second pane 110. Preferably, both panes 100, 110 are glass panes. A variety of well-known glass types can be used for the first 100 and second 110 panes, such as soda-lime glass, borosilicate glass, or aluminosilicate glass. In some cases, it may be desirable to use "white glass," a low iron glass, etc. For some applications, it may be desirable to use tinted glass for one or both panes 100, 110. Moreover, there may be applications where one or both panes 100, 110 are formed of extremely thin, flexible glass, such as glass sold under the trademark Willow glass by Corning Inc. (Corning, New York, USA). If desired, one or both panes 100, 110 may be formed of a chemically strengthened glass, such as glass sold under the trademark Gorilla glass by Corning Inc.

Glass panes of various sizes can be used in the present invention. Commonly, large-area glass panes are used. Certain embodiments involve first and second panes 100, 110 formed of glass and each having a major dimension (e.g., a length or width) of at least about 0.5 meter, preferably at least about 1 meter, perhaps more preferably at least about 1.5 meters (e.g., between about 2 meters and about 4 meters), and in some cases at least about 3 meters.

Glass panes of various thicknesses can be used in the present invention. In some embodiments, each pane 100, 110 is a glass pane with a thickness of about 1-8 mm. Certain embodiments involve glass panes with a thickness of between about 2.3 mm and about 4.8 mm, and perhaps more preferably between about 2.5 mm and about 4.8 mm. In one particular embodiment, panes of glass (e.g., soda-lime glass) with a thickness of about 3 mm are used.

In alternative embodiments, one or both panes 100, 110 are formed of a polymer, such as polycarbonate, acrylic, or PVC. Various other polymers (e.g., transparent polymers) can be used.

As noted above, the multiple-pane insulating glazing unit 40 preferably has only one between-pane space 50. In some cases, the first pane is a glass pane that is part of a laminated glass panel, which further comprises a polymer interlayer and another glass pane. Additionally or alternatively, the second pane can be a glass pane that is part of a laminated glass panel, which further comprises a polymer interlayer and another glass pane. Thus, in some cases, the between-pane space is located between two laminated glass panels. In many embodiments, however, the multiple-pane insulating glazing unit 40 has only two panes. In addition, it preferably does not include (i.e., is devoid of) a second between-pane space.

Figure 6:
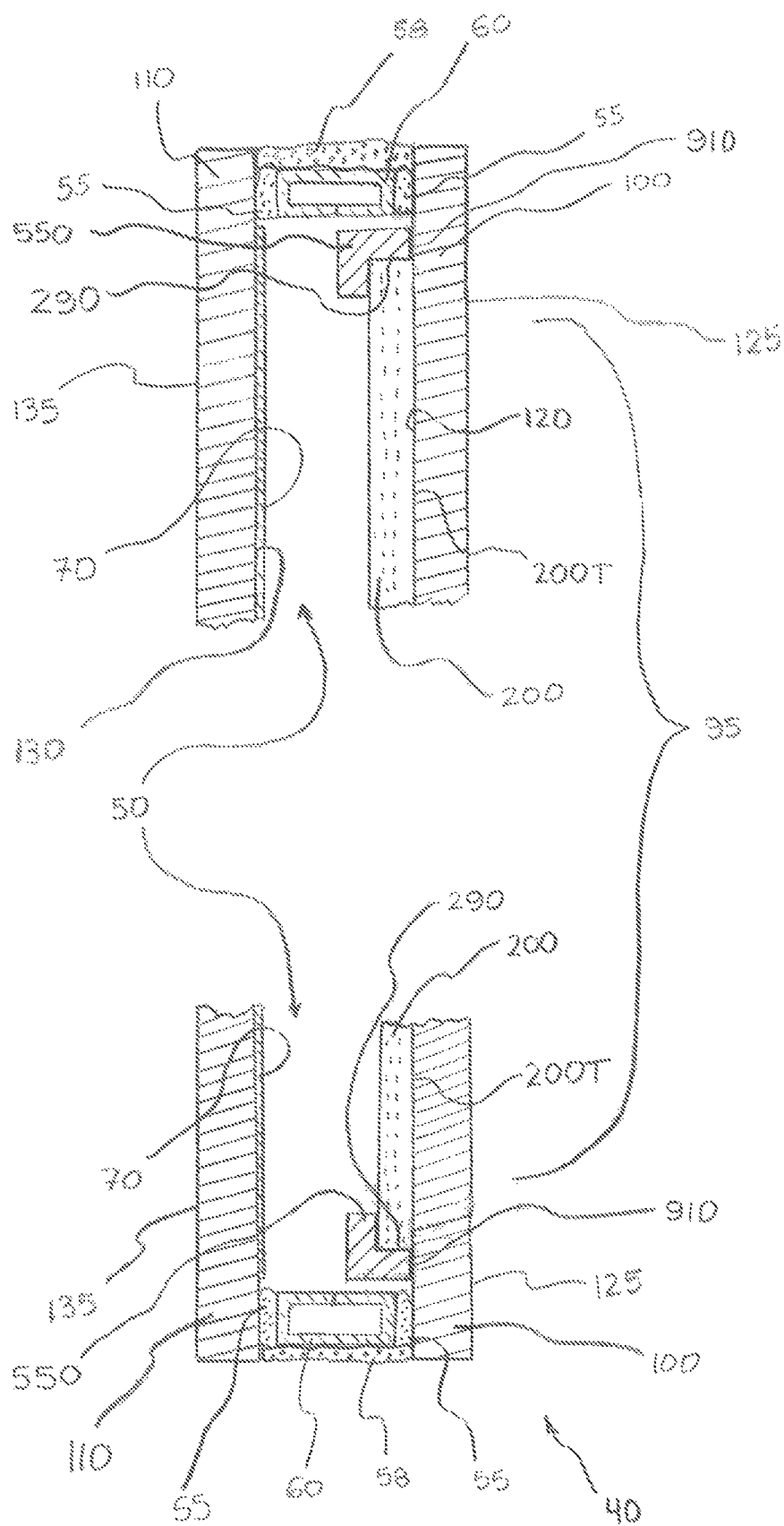
FIG. 6 is a schematic, broken-away, cross-sectional side view of a double-pane insulating glazing unit in accordance with certain embodiments of the invention.

The first pane 100 has opposed surfaces 120, 125, which preferably are opposed major surfaces (or "opposed faces"). Similarly, the second glass pane 110 has opposed surfaces 130, 135, which preferably are opposed major surfaces (or "opposed faces"). As shown in FIG. 6, surfaces 120 and 130 are confronting interior surfaces that face the between-pane space 50. In contrast, surfaces 125 and 135 are exterior surfaces that face away from the between-pane space 50. Preferably, surface 135 is configured to be an outboard surface exposed to an outdoor environment (and thus exposed to periodic contact with rain), while surface 125 is configured to be an inboard surface exposed to an indoor environment within a house or another building. Accordingly, the first pane 100 preferably is configured to be an inboard pane, while the second pane 110 preferably is configured to be an outboard pane.

In some cases, the IG unit 40 has a thickness of less than 30 mm, less than 25 mm, less than 23 mm, or even less than 22 mm. For any embodiment of the present disclosure, the IG unit 40 thickness can optionally be in any one or more of these ranges. The thickness of the IG unit 40 is defined as the distance between the opposed exterior pane surfaces (e.g., from surface 125 to surface 135).

Figure 15:
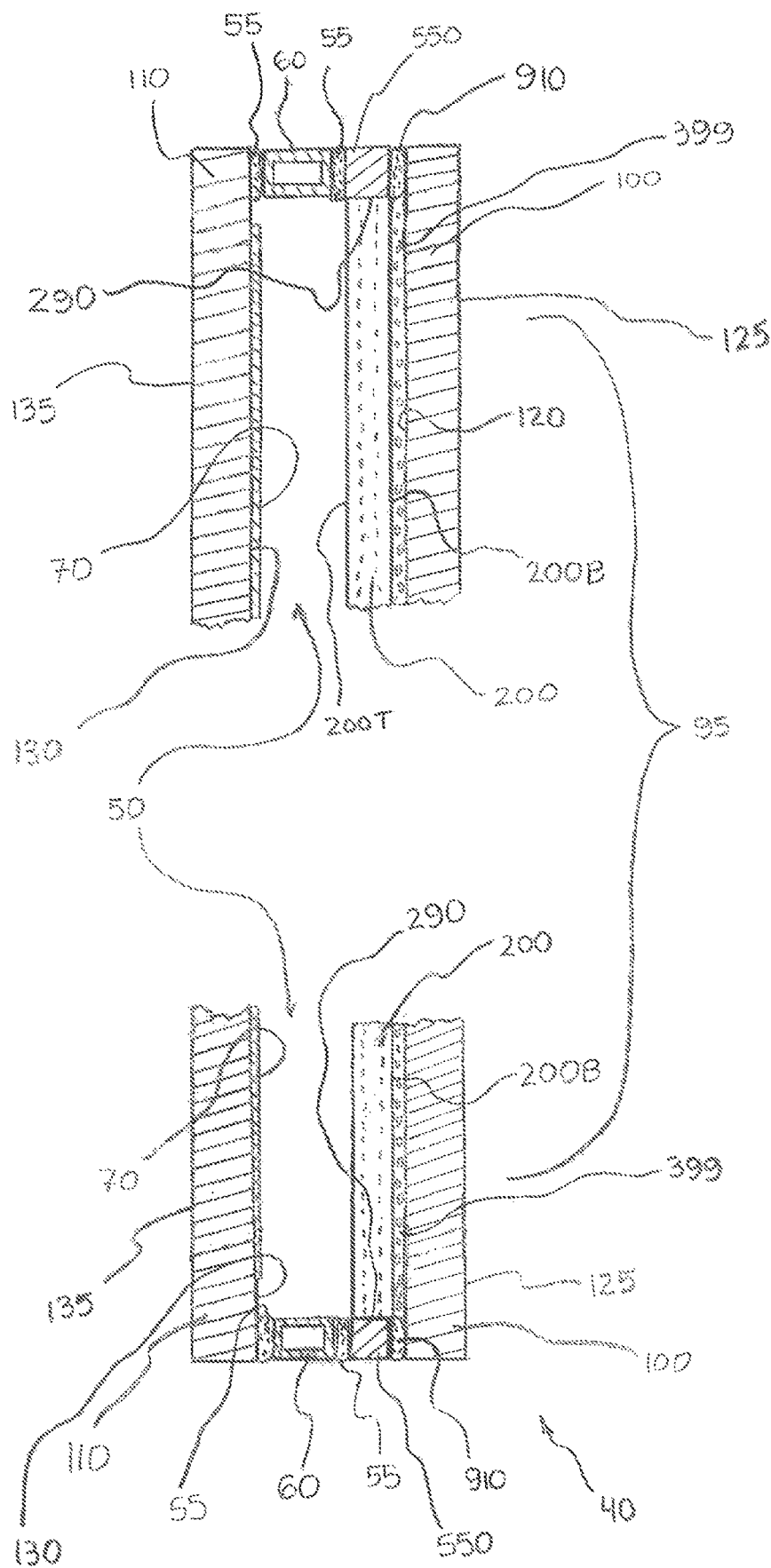
FIG. 15 is a schematic, broken-away, cross-sectional side view of a double-pane insulating glazing unit in accordance with certain embodiments of the invention.

The aerogel sheet 200 is located between the first 100 and second 110 panes, i.e., in the between-pane space 50. Preferably, the aerogel sheet 200 is adjacent (e.g., mounted alongside, and in some cases adhered to) an interior surface 120 of the first pane 100. In other embodiments, the aerogel sheet is adjacent (e.g., mounted alongside, and in some cases adhered to) the interior surface of the second pane. In arrangements of either type, there can optionally be one or more coatings or layers between such pane and the aerogel sheet. In some cases, a coating or layer is provided, e.g., to help adhere the aerogel sheet to the pane. As one example, a layer of optical adhesive 399 may be provided. Reference is made to FIG. 15. In other cases, the aerogel sheet is in direct contact with the material (e.g., glass) of the pane. Thus, the aerogel sheet 200 preferably is carried alongside (and in some cases, is in contact with) one of the panes 100, 110. Another option is to provide the aerogel sheet on a suspended film mounted within the between-pane space, e.g., such that both the suspended film and the aerogel sheet are spaced apart from both panes.

As used herein, the term "aerogel" refers to a material obtained by combining either a nonfluid colloidal network or a polymer network with a liquid so as to form a gel, and then removing the liquid from the gel and replacing the liquid with a gas or vacuum. As discussed below, the resulting aerogel has very low density and provides excellent insulating properties.

The aerogel sheet 200 can comprise (e.g., can be) a silica-based aerogel or a polymer-based aerogel. In some cases, silica-based aerogel is used. In such cases, the aerogel sheet 200 can advantageously be produced, and can have properties, in accordance with U.S. Patent Application No. 63/318,165, entitled "Silica Wet Gel and Aerogel Materials," the contents of which are incorporated herein by reference. In other cases, the aerogel is a cellulose-based aerogel. Aerogels of this nature are described in U.S. patent Application Publication No. US2019/0055373, entitled "Bacterial Cellulose Gels, Process for Producing and Methods of Use," the teachings of which are incorporated herein by reference. In such cases, the aerogel can contain cellulosic nanocomposites that are aligned in ordered liquid crystal phases. Various other aerogel materials are commercially available or otherwise known; any suitable aerogel material can be used.

The present aerogel is in the form of a sheet. This is in contrast to aerogel in flowable granular or other particulate form. The aerogel sheet 200 preferably is self-supporting, i.e., once fully synthesized and formed, it can retain its sheet form without being adhered to glass or another support. It is to be appreciated, however, that once incorporated into the IG unit 40, the aerogel sheet 200 preferably is supported (directly or indirectly) by one of the panes 100, 110. As illustrated, the IG unit 40 preferably does not include any cell or honeycomb structure surrounding/containing particulate aerogel.

The aerogel sheet 200 has opposed major surfaces (or "faces"). In some cases, one face of the aerogel sheet 200 is carried alongside (optionally so as to contact) an interior surface 120, 130 of one of the panes 100, 110, while the other face of the aerogel sheet is exposed to a gas gap of the between-pane space 50. In addition, the peripheral edge 290 of the aerogel sheet 200 preferably is located within the between-pane space 50. This can optionally be the case along the entire perimeter of the aerogel sheet 200.

The aerogel sheet 200 preferably spans (e.g., covers) more than 75%, more than 80%, or even more than 90%, of the area of the adjacent interior pane surface 120, 130. An aerogel span (e.g., coverage) within any one or more (e.g., all) of these ranges can optionally be used in any embodiment of the present disclosure.

In some cases, the aerogel sheet 200 is adhered to an interior surface 120, 130 of one of the panes 100, 110. By saying the aerogel layer is "adhered to" a pane surface, this does not require any separate adhesive. It also does not require that the aerogel contact the pane; there may be a coating or layer therebetween. The aerogel sheet 200 preferably is bonded to or otherwise supported by (e.g., directly or indirectly) the pane surface. In some cases, the aerogel sheet does not contact the pane (e.g., glass) surface. As one example, there can be a layer (e.g., an optical adhesive layer 399) between the aerogel sheet 200 and the adjacent pane 100, 110.

Figure 7:
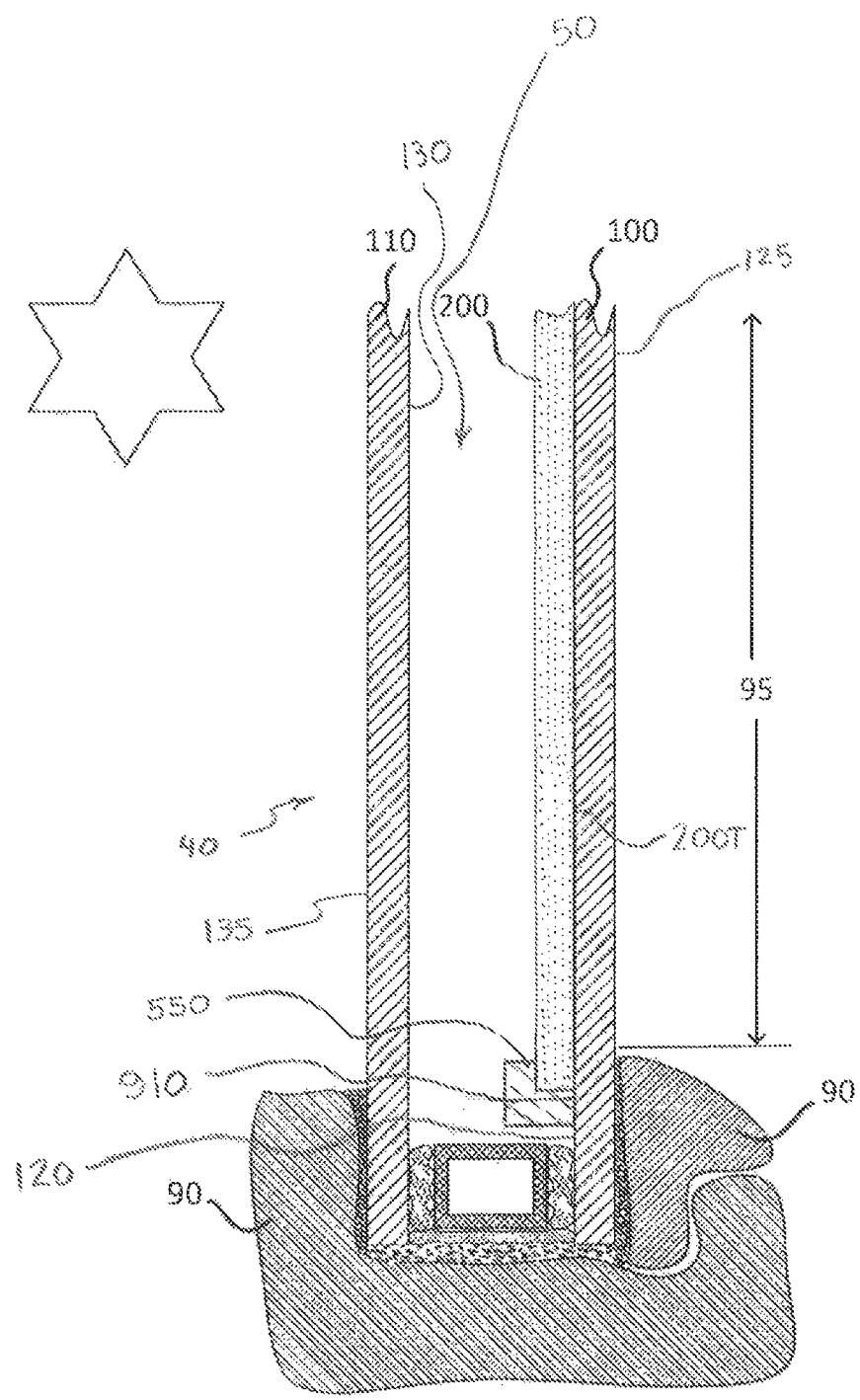
FIG. 7 is a schematic, broken-away, cross-sectional side view of a double-pane insulating glazing unit mounted in a frame in accordance with some embodiments of the invention.
Figure 8:
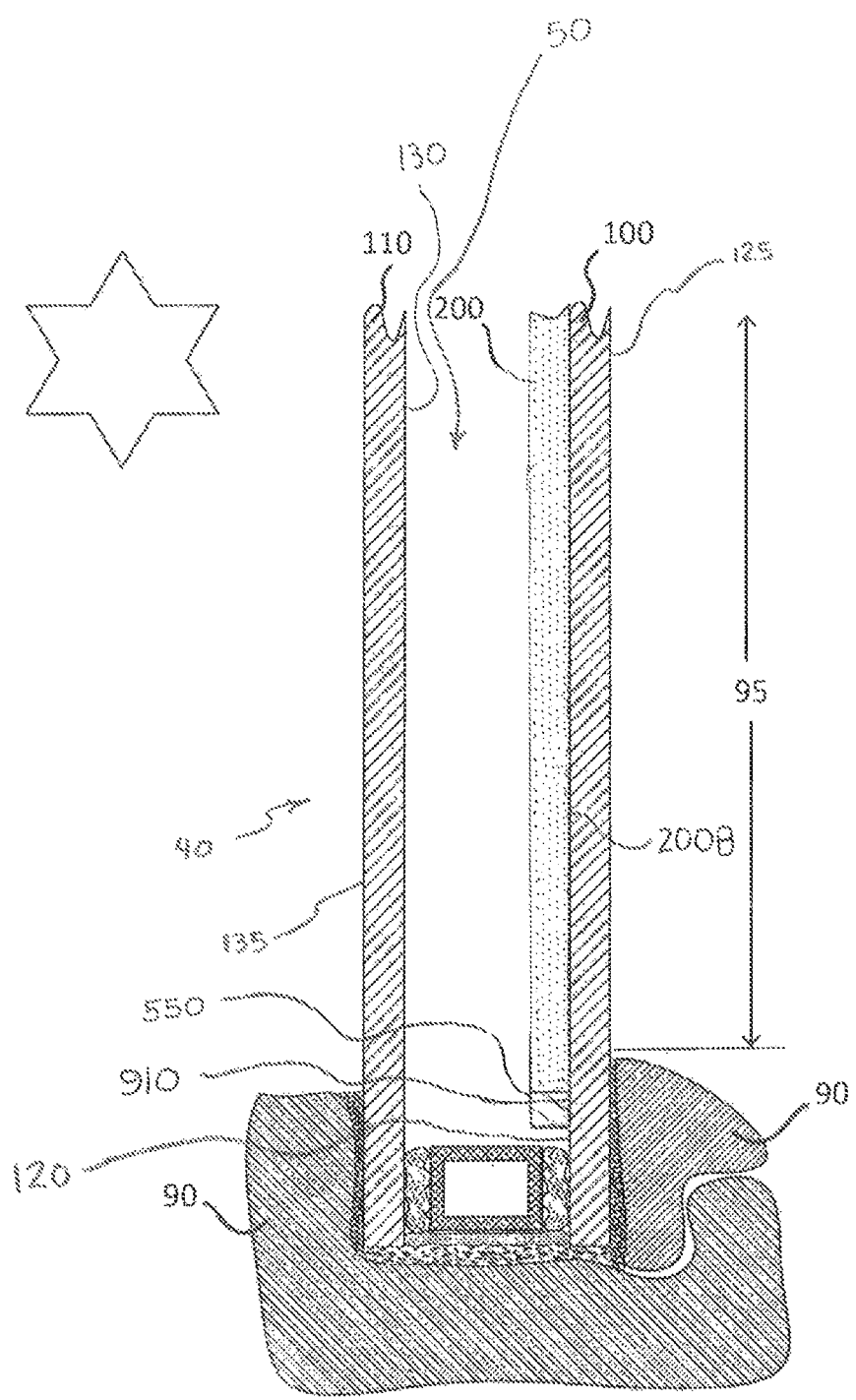
FIG. 8 is a schematic, broken-away, cross-sectional side view of a double-pane insulating glazing unit mounted in a frame in accordance with some other embodiments of the invention.

The IG unit 40 has a vision area 95. Reference is made to FIGS. 6 and 15. As used herein, the term "vision area" refers to the area of the IG unit 40 through which a person is able to see once the IG unit is mounted operably in a frame 90. In FIGS. 7 and 8, the vision area 95 of an IG unit 40 mounted in a frame 90 is shown. In embodiments where the IG unit 40 is mounted in a frame 90, the frame may delineate the vision area 95 (e.g., such that the vision area is the area inward from an interior edge of the frame). The peripheral edge 290 of the aerogel sheet 200 preferably is located outside of the vision area 95 (e.g., so as to be positioned at locations that will be concealed from view by the frame 90). This can optionally be the case for any embodiment of the present disclosure.

The aerogel sheet 200 preferably spans (e.g., covers) a majority (i.e., greater than 50%) of the vision area 95. In some embodiments, the aerogel sheet 200 spans (e.g., covers) at least 60%, at least 75%, or at least 80% of the vision area 95 of the multiple-pane insulating glazing unit 40. Preferably, the aerogel sheet 200 spans (e.g., covers) an entirety of the vision area 95. This can optionally be the case for any embodiment of the present disclosure that involves an IG unit 40.

With reference to the frame described in the present disclosure, this frame can optionally be, or include, a sash or part of a sash (e.g., an exterior weather strip and/or glazing bead). The vision area is determined when looking straight at the adjacent pane surface from a vantage point aligned with an outermost perimeter of the vision area. Moreover, to the extent an outboard portion of the frame projects further inwardly than does an inboard portion of the frame (or vice versa), the vision area is to be considered that area that is inward of the frame portion that projects furthest inwardly. This can be appreciated by referring to FIGS. 7 and 8. In some cases, that frame portion may be a sash portion comprising vinyl or another polymer.

In certain embodiments (e.g., where the IG unit 40 is mounted in a frame 90), the unit 40 is part of a window, door, skylight, or other glazing.

As noted above, in some embodiments, the between-pane space 50 contains a thermally insulative gas mix, such as a mix of 90% argon and 10% air. This, however, is not required. For example, the IG unit 40 can alternatively be filled with air or a desired single gas. Moreover, if desired, the between-pane space 50 (including any gas gap thereof) can be evacuated to a desired vacuum level, such as a moderate vacuum level, so as to further enhance the thermal insulation properties of the IG unit 40.

In some embodiments, the second pane 110 is an outboard pane that defines both a #1 surface (i.e., surface 135) and a #2 surface (i.e., surface 130), and the first pane 100 is an inboard pane that defines both a #3 surface (i.e., surface 120) and a #4 surface (i.e., surface 125). As noted above, the IG unit 40 can optionally be mounted in a frame 90. Reference is made to the non-limiting examples of FIGS. 7 and 8. Here, the #1 surface is exposed to an outdoor environment, while the #4 surface preferably is exposed to an indoor environment. The frame 90 can be any type of window frame or other glazing frame; the frame can be a sash.

The aerogel sheet can be adjacent to (e.g., mounted alongside, and in some cases adhered to) either the #3 surface or the #2 surface of the IG unit. Another option is to have aerogel sheets adjacent to (e.g., mounted alongside, and in some cases adhered to) both the #3 and #2 surfaces.

Preferably, the IG unit 40 also includes a low-emissivity coating 70. Reference is made to FIGS. 6 and 15, where the #2 surface bears a low-emissivity coating 70. In embodiments of this nature, the aerogel sheet 200 can be adjacent to (e.g., mounted alongside, and in some cases adhered to) the #3 surface (i.e., surface 120) while being spaced apart from the low-emissivity coating 70. Alternatively, the aerogel sheet can be adjacent to (e.g., mounted alongside, and in some cases adhered to) the #2 surface, while a low-emissivity or solar control coating is on the #3 surface. Preferably, the aerogel sheet 200 is spaced apart from the low-emissivity coating 70 by at least 2 mm but not more than 15 mm (e.g., by 4-15 mm, or 10-15 mm).

When provided, the low-emissivity coating 70 preferably includes at least one silver-inclusive film, which desirably contains more than 50% silver by weight (e.g., a metallic silver film). In certain preferred embodiments, the low-emissivity coating 70 includes three or more infrared-reflective films (e.g., silver-containing films). Low-emissivity coatings having three or more infrared-reflective films are described in U.S. patent application Ser. No. 11/546,152 and U.S. Pat. Nos. 7,572,511 and 7,572,510 and 7,572,509 and Ser. No. 11/545,211 and U.S. Pat. Nos. 7,342,716 and 7,339,728, the teachings of each of which are incorporated herein by reference. In some cases, the low-emissivity coating 70 includes four silver layers. In other cases, the low-emissivity coating 70 is a "single silver" or "double silver" low-emissivity coating, which are well-known to skilled artisans. Various low-emissivity coatings are commercially available from Cardinal CG Company (Eden Prairie, Minnesota, U.S.A.).

As noted above, the IG unit 40 includes a spacer 60 between the two panes 100, 110. The spacer 60 can be a conventional metal channel spacer, e.g., formed of stainless steel or aluminum. Or, it can comprise polymer and metal, or just polymer (e.g., foam). The spacer can alternatively be an integral part of a sash, frame, etc.

The aerogel sheet 200 preferably does not contact the spacer 60. For example, the aerogel sheet 200 may be separated (i.e., spaced apart) from the spacer 60 by about 1 mm to about 5 mm (e.g., about 2-4 mm, or about 3 mm). Furthermore, when provided, sealant 55 between the spacer 60 and the two panes 100, 110 preferably is separated from the aerogel sheet 200.

In various embodiments, the spacer 60 either is adhered to both of the two panes 100, 110 or is adhered to only one 110 of the two panes. In some cases, the spacer 60 is adhered to both of the panes 100, 110 by one or more beads of sealant 55, 58. Reference is made to FIGS. 6-8. Here, the spacer 60 is adhered to both of the two panes 100, 110, and the perimeter mold frame 550 is surrounded by and located inwardly of (e.g., spaced apart inwardly from) the spacer.

In the non-limiting examples of FIGS. 6-8, the IG unit 40 includes both: (i) beads 55 of primary sealant, and (ii) a deposit 58 of secondary sealant. In embodiments of this nature, the beads 55 of primary sealant may comprise polyisobutylene ("PIB"), optionally carbon-filled PIB, while the deposit 58 of secondary sealant comprises silicone. It is to be appreciated, however, that various other sealant materials can be used. Polysulphide or polyurethane, for example, can be used as a secondary sealant.

Rather than having a double-seal system, the IG unit 40 can optionally have a single-seal system. In the non-limiting example of FIG. 15, for example, the IG unit 40 does not include (i.e., is devoid of) a deposit 58 of secondary sealant. It is to be appreciated, however, that secondary sealant preferably is added to the IG unit arrangement shown in FIG. 15. More generally, any IG unit 40 of the present disclosure can be provided with any desired sealing system, e.g., any known single-seal system or any known double-seal system.

Commonly, a particulate desiccant is provided inside the spacer 60, and the spacer is provided with holes that enable gaseous communication between the interior of the spacer and the between-pane space 50 of the IG unit 40. In such cases, the desiccant can extract water vapor from the between-pane space.

In certain embodiments, a first side of the perimeter mold frame 550 is adhered to a first 100 of the two panes, a second side of the perimeter mold frame is adhered to a first side of the spacer 60, and a second side of the spacer is adhered to a second 110 of the two panes. Reference is made to the non-limiting example of FIG. 15. Here, the perimeter mold frame 550 and the spacer 60 are sealed side-by-side between the two panes 100, 110, while the perimeter mold frame surrounds and embraces (e.g., holds) the perimeter of the aerogel sheet 200. In embodiments of this nature, the optical adhesive 399 may be omitted. In such cases, the aerogel sheet can alternatively be bonded to the pane surface by van der Waals forces.

The between-pane space 50 has a width extending from the interior surface 120 of the first pane 100 to the interior surface 130 of the second pane 110. The aerogel sheet 200 preferably does not occupy the entire width of the between-pane space 50. Instead, there preferably is a gas gap alongside the aerogel sheet 200 in the between-pane space 50.

The aerogel sheet 200 has a thickness. In some embodiments, the thickness of the aerogel sheet 200 is in a range of from 1.5 mm to 15 mm, such as greater than 2 mm but less than 8 mm, or in a range of from 2 mm to 4 mm (e.g., 3 mm). It is to be appreciated, however, that other thicknesses can be used.

A ratio of the thickness of the aerogel sheet 200 to the width of the between-pane space 50 preferably is between 0.15 and 0.85. In some embodiments, the width of the between-pane space 50 is 13 mm or greater, optionally together with the thickness of the aerogel sheet 200 being greater than 2 mm but less than 8 mm (such as from 2.5-5.5 mm). In certain embodiments, the aerogel sheet 200 occupies less than 50% of the width of the between-pane space 50, e.g., less than 45%, less than 40%, or even less than 35% of the width of the between-pane space.

The aerogel sheet 200 preferably has an index of refraction of less than 1.1 (such as between 1.0 and 1.1, or more preferably between 1.0 and 1.04). This index of refraction (at 550 nm) can optionally be provided in combination with the aerogel sheet 200 having a thickness in a range of from 1.5 mm to 15 mm (such as greater than 2 mm but less than 8 mm, or from 2-4 mm). It is to be appreciated, however, that the index of refraction values noted in this paragraph are optional, and a higher index of refraction may be provided in some cases.

The aerogel sheet 200 preferably has a haze of less than 4% (e.g., less than 3%, less than 2%, or even less than 1%). This haze level can optionally be provided in combination with the aerogel layer 200 having an index of refraction of less than 1.1 (and optionally being in either of the closed ranges noted in the preceding paragraph). It is to be appreciated, however, that this haze level is optional. For example, higher haze levels may be suitable depending on the intended application.

Haze can be measured in well-known fashion, e.g., using a BYK Haze-Gard plus instrument. Reference is made to ASTM D 1003-00: Standard Test method for Haze and Luminous Transmittance of Transparent Plastics, the contents of which are incorporated herein by reference.

The aerogel sheet 200 preferably has a visible transmittance of greater than 90%. Thus, for any embodiment of the present disclosure, the visible transmittance of the aerogel sheet 200 can optionally be greater than 90%. In certain preferred embodiments, the visible transmittance is greater than 92%, greater than 95%, or even 97%, for the aerogel sheet 200.

The term "visible transmittance" is well known in the art and is used herein in accordance with its well-known meaning to refer to the percentage of all incident visible radiation that is transmitted through an object (e.g., through the aerogel sheet 200). Visible radiation constitutes the wavelength range of between about 380 nm and about 780 nm. Visible transmittance, as well as visible reflectance, can be determined in accordance with NFRC 300-2017, Standard Test Method for Determining the Solar and Infrared Optical Properties of Glazing Materials and Fading Resistance of Systems. The well-known LBNL WINDOW 7.4 computer program can be used in calculating these and other reported optical properties.

The aerogel sheet 200 preferably exhibits a transmitted color characterized by "a" and "b" color coordinates that are each between −2 and 2. The present discussion of color properties is reported using the well-known color coordinates of "a" and "b." In more detail, the color coordinates are indicated herein using the subscript h (i.e., $a_h$ and $b_h$) to represent conventional use of the well-known Hunter Lab Color System (Hunter methods/units, Ill. D65, 10 degree observer). The present color properties can be calculated as specified in "Insight on Color," "Hunter L, a, b Color Scale," Applications Note, Vol. 8, No. 9, June 2008 (2008), the relevant teachings of which are incorporated herein by reference.

In addition, the aerogel sheet 200 has a low density. In certain embodiments, the aerogel sheet 200 has a density of less than 250 kg/m$^3$. In some embodiments, the aerogel sheet 200 has a density of less than 235 kg/m$^3$, such as less than 220 kg/m$^3$, or even less than 200 kg/m$^3$.

The aerogel sheet 200 also has a low thermal conductivity. In some embodiments, the aerogel sheet 200 has a thermal conductivity at atmospheric pressure of less than 0.015 W/(m·K) but greater than or equal to 0.006 W/(m·K). In certain embodiments, the aerogel sheet 200 has a thermal conductivity at atmospheric pressure of less than 0.03 W/(m·K) but greater than or equal to 0.006 W/(m·K).

Preferably, the aerogel sheet 200 has an R value of between 0.9 and 3.8 ft$^2$·° F.·h/BTU. This can optionally be the case for any embodiment of the present disclosure. The R value of the aerogel sheet 200 (in imperial units) can be calculated by dividing the thickness of the aerogel sheet 200 (in meters) by the thermal conductivity, and then multiplying that value by 5.7.

As noted above, the aerogel can be cellulose-based aerogel, e.g., of the nature described in U.S. patent Application Publication No. US2019/0055373, entitled "Bacterial Cellulose Gels, Process for Producing and Methods of Use." Such aerogels can have all of the properties and features described above. Thus, in any embodiment of the present disclosure, the aerogel can optionally be cellulose-based aerogel. A preferred option is for the aerogel sheet 200 to comprise silica, e.g., of the nature described U.S. Patent Application No. 63/318,165, entitled "Silica Wet Gel and Aerogel Materials." These aerogels can have all the properties and features described above. In any embodiment of the present disclosure, the aerogel can optionally be silica-based aerogel. However, any suitable aerogel material can be used.

In some embodiments, the low-emissivity coating 70 is on an interior surface 120, 130 of one of the two panes 100, 110, while the aerogel sheet 200 is adjacent to (e.g., mounted alongside, and in some cases adhered to) an interior surface 120, 130 of the other of the two panes 100, 110. In such cases, the low-emissivity coating 70 and the aerogel sheet 200 are both located in the between-pane space 50. Reference is made to the non-limiting examples of FIGS. 6 and 15. In embodiments of this nature, the low-emissivity coating 70 and the aerogel sheet 200 are separated from each other by a gas gap, which preferably contains a gaseous atmosphere. In these embodiments, the IG unit 40 preferably has a U factor in a range of from 0.11 to 0.21 Btu/(h·f$^2$·° F.), a visible transmission in a range of 0.64 to 0.76, and a haze of from 0.5% to 4%. The U factor, visible transmission, and haze can optionally be within these ranges for any IG unit 40 of the present disclosure. In some cases, the U factor is less than 0.2 Btu/(h·f$^2$·° F.) but greater than 0.14 Btu/(h·f$^2$·° F.), and the visible transmission is greater than 0.65 but less than 0.76. In addition, the haze of the IG unit 40 can optionally be from 1-2%.

In certain embodiments of the present group, the between-pane space 50 has a width in a range of from 13 to 21 mm. In such embodiments, the aerogel sheet 200 preferably has a thickness of greater than 2 mm but less than 8 mm, or from 2-4 mm. Furthermore, in some embodiments of this nature, the gaseous atmosphere comprises argon, air, or both, and the gas gap has a width in a range of from 9 to 14 mm.

The multiple-pane insulating glazing unit can optionally further include a transparent conductive oxide coating on an exterior surface of one of the two panes. In some cases, the aerogel sheet and a transparent conductive oxide coating are both supported by (e.g., by being on opposite surfaces of) the first pane. In such embodiments, the U factor preferably is in a range of from 0.11 to 0.19 Btu/(h·f$^2$·° F.). A transparent conductive oxide coating (e.g., added on surface 125) can optionally be provided in any embodiment of the present disclosure.

When provided, the transparent conductive oxide coating may comprise, consist essentially of, or consist of indium tin oxide ("ITO"). In alternate embodiments, zinc aluminum oxide, SnO:Sb, sputtered SnO:F, or another known TCO is used. Thus, in certain embodiments, the transparent conductive oxide coating includes a sputtered film that includes tin (e.g., comprising tin oxide together with antimony, fluorine, or another dopant). In other embodiments, the transparent conductive oxide coating includes a pyrolytic film that includes tin (e.g., comprising tin oxide together with antimony, fluorine, or another dopant). In some cases, the TCO film (which either forms or is part of the transparent conductive oxide coating) includes carbon nanotubes. Preferably, the TCO film (which optionally comprises ITO) is provided at a thickness of 10,000 Å or less, such as between about 1,000 Å and about 7,000 Å, e.g., from 1,000 Å to 1,750 Å, such as about 1,300-1,600 Å. For any embodiment where the transparent conductive oxide coating is provided, it can optionally comprise a TCO (e.g., ITO) film having a thickness of from 1,000 Å to 1,750 Å.

The transparent conductive oxide coating can, for example, be a coating of the type described in any of U.S. Pat. No. 9,862,640 or 10,000,965 or 10,000,411 or patent application Ser. No. 16/740,006, the teachings of each of which concerning the transparent conductive oxide coating are hereby incorporated herein by reference.

Thus, in some cases, the multiple-pane insulating glazing unit includes both a transparent conductive oxide coating and a low-emissivity coating. This, however, is not required. For example, the IG unit 40 can include a low-emissivity coating 70 while being devoid of a transparent conductive oxide coating. Reference is made to FIGS. 6 and 15. If desired, a transparent conductive oxide coating can be added on surface 125 in the embodiments of FIG. 6 or 15. Additionally or alternatively, a TCO coating can be added on surface 135. Similarly, a transparent conductive oxide coating can optionally be added on surface 125 in the embodiments of FIGS. 7 and 8. Additionally or alternatively, a TCO coating can be added on surface 135 in the embodiments of FIGS. 7 and 8.

The multiple-pane insulating glazing unit 40 preferably has pleasing color properties. For example, it preferably has a transmitted color characterized by an a coordinate in a range of from 0 to −6 and a $b_h$ coordinate in a range of from −1 to 5. In some cases, the transmitted color is characterized by an a coordinate in a range of from −1 to −5 and a b coordinate in a range of from 0 to 4. In addition, the multiple-pane insulating glazing unit 40 preferably has an exterior reflected color characterized by an $a_h$ coordinate in a range of from 2 to −4 and a $b_h$ coordinate in a range of from 1 to −5. In some cases, the exterior reflected color is characterized by an $a_h$ coordinate in a range of from 1 to −3 and a $b_h$ coordinate in a range of from 0 to −4.

The invention also provides a third group of embodiments involving a method for producing multiple-pane insulating glazing units 40. The method includes performing first and second subassembly operations, and thereafter performing a coupling operation. The first subassembly operation includes mounting an aerogel sheet 200 alongside (optionally so as to contact) a surface 120 of a first pane 100 to form a first glazing subassembly 700. The second subassembly operation includes adhering a spacer 60 onto a perimeter of a surface of a second pane 110 to form a second glazing subassembly 600. The coupling operation includes assembling together the first 700 and second 600 glazing subassemblies, e.g., such that the spacer 60 and the aerogel sheet 200 are located between the first 100 and second 110 panes.

It is to be appreciated that the order of the first and second subassembly operations is not limiting. In some cases, the first subassembly operation is performed before the second subassembly operation. In other cases, the second subassembly operation is performed before the first subassembly operation. In still other cases, the first and second subassembly operations are performed simultaneously. Preferably, the first and second subassembly operations are performed at different locations of an assembly line, e.g., respectively at a first subassembly station upstream from a second subassembly station. In such cases, the assembly line preferably comprises a continuous path of substrate travel (e.g., a continuous conveyance path) on which both of the first and second subassembly stations are located. There may be, for example, one or more bottom conveyors 41 in alignment along such a path of substrate travel. In other cases, there are two parallel conveyor line sections where the first and second subassembly stations are respectively located (and where the first and second subassembly operations are respectively performed).

Preferably, the first subassembly operation includes moving the aerogel sheet 200 toward the surface 120 of the first pane 100. In some cases, the aerogel sheet 200 is thereby moved into contact with the surface 120 of the first pane 100, and the first subassembly operation includes pressing the aerogel sheet against the surface of the first pane. Doing so preferably results in the aerogel sheet 200 adhering to (e.g., through van der Waals forces) the surface 120 of the first pane 100. In some cases, an optional optical adhesive 399 adheres the aerogel sheet 200 to the surface 120 of the first pane 100. Reference is made to the non-limiting example of FIG. 15.

In certain embodiments, the mounting of the aerogel sheet 200 alongside a surface 120 of the first pane 100 to form the first glazing subassembly 700 includes bonding the aerogel sheet to the surface of the first pane. It is not always the case, however, that the aerogel sheet 200 mounted alongside the surface 120 of the first pane 100 actually contacts that surface. Moreover, while the present discussion focuses on mounting the aerogel sheet 200 alongside the surface 120 of the first pane 100, the method can alternatively involve mounting the aerogel sheet alongside the surface 130 of the second pane 110. In such cases, a low-emissivity coating or solar control coating can optionally be provided on surface 120 of the first pane 100.

The aerogel sheet 200 can be moved toward the first pane 100 in different ways. As one example, it can be moved manually. Thus, the first subassembly operation can be carried out manually, e.g., by one or more workers holding the aerogel sheet 200 while moving it toward the first pane 100 and ultimately mounting the aerogel sheet 200 alongside (optionally by adhering or otherwise placing the aerogel sheet on) the surface 120 of the first pane 100. In some cases, this includes pressing the aerogel sheet 200 (e.g., forcibly) against the surface 120 of the first pane 100. It is not required that the aerogel sheet 200 contact the adjacent pane surface 120, 130 after being mounted alongside that surface.

Preferably, the first subassembly operation involves moving the aerogel sheet 200 toward the first pane 100 (e.g., in direction A2, as shown in FIGS. 9 and 10) using an automated handling station. In such cases, the automated handling station may include a robot arm (e.g., a multi-axis robot arm) equipped to handle the aerogel sheet 200. Reference is made to the non-limiting example of FIGS. 9 and 10. Here, a robot arm is equipped with a gripper 750 configured to hold (e.g., grip) a perimeter mold frame 550 that embraces the aerogel sheet 200. In embodiments of this nature, the robot arm and gripper preferably are configured to perform the first subassembly operation without the gripper 750 contacting the aerogel sheet 200.

Thus, in some embodiments of the third embodiment group, the first subassembly operation involves applying an aerogel-frame subassembly onto a surface 120 of the first pane 100 to form the first glazing subassembly 700. Reference is made to the non-limiting examples of FIGS. 9 and 10. In such embodiments, the aerogel-frame subassembly includes the aerogel sheet 200 and a perimeter mold frame 550. As already described, the perimeter mold frame 550, when provided, is disposed about a perimeter of the aerogel sheet 200.

Preferably, the application of an aerogel-frame subassembly onto the surface 120 of the first pane 100 to form the first glazing subassembly 700 includes adhering the perimeter mold frame 550, the aerogel sheet 200, or both to the surface of the first pane. For example, the perimeter mold frame 550 can be adhered to surface 120 of the first pane 100 by sealant 910, and/or the aerogel sheet 200 can be adhered to surface 120 by adhesive 399. Reference is made to the non-limiting examples of FIGS. 9, 10, 15, and 18.

In the present third embodiment group, it is not required that there be any perimeter mold frame. For example, the robot arm may have a gripper configured to grip the aerogel sheet directly. The robot arm, for example, can be equipped with one or more electrostatic grippers configured to grip the aerogel sheet. Advantageous methods and equipment of this nature are described in U.S. Patent Application No. 63/387,442, entitled "Handling Technology for Fragile Materials such as Aerogels," the contents of which are incorporated herein by reference. In embodiments of this nature, the method may include operating the robot arm so as to hold the aerogel sheet while moving it toward the first pane and ultimately pressing the aerogel sheet against (e.g., so as to adhere it to) a surface of the first pane. In other embodiments involving a robot arm equipped with one or more electrostatic grippers, the method may include operating the robot arm so as to hold the aerogel sheet while moving it toward the second pane and ultimately pressing the aerogel sheet against (e.g., so as to adhere it to) a surface of the second pane.

Insofar as the first subassembly operation is concerned, the foregoing examples are just a few options for mounting the aerogel sheet 200 alongside the desired surface 120, 130 of the desired pane 100, 110. Various other techniques and different automation stations can be used to mount the aerogel sheet alongside the desired surface of the desired pane, whether or not it results in the aerogel sheet being in contact with such surface. Moreover, for embodiments that involve a perimeter mold frame, various other perimeter mold frame configurations can be used.

The second subassembly operation preferably includes moving the spacer 60 toward the surface 130 of the second pane 110. When moving the spacer 60 toward the surface 130 of the second pane 110, the spacer preferably already has two beads (i.e., first and second beads) of sealant located respectively on two opposed sides of the spacer. This is the case in the non-limiting example of FIG. 13. In more detail, the spacer 60 preferably is adhered to the perimeter of the surface 130 of the second pane 110 by pressing the second bead of sealant against that surface. The resulting second glazing subassembly 600 can be appreciated by referring to the non-limiting examples of FIGS. 16-19.

The spacer 60 can be moved toward the second pane 110 in different ways. For example, it can be moved manually. Thus, the second subassembly operation can be carried out manually, e.g., by one or more workers holding the spacer 60 while moving it toward the second pane 110 and ultimately pressing the spacer against the surface 130 of the second pane.

More preferably, the second subassembly operation involves moving the spacer 60 toward the second pane 110 using an automated handling station. In such cases, the automated handling station may include a robot arm (e.g., a multi-axis robot arm) 10 configured to handle the spacer 60. Reference is made to FIGS. 11-14. In performing the second subassembly operation, the spacer 60 can be applied onto the second pane 110 using the method and apparatus described in U.S. Pat. No. 11,536,083, entitled "AUTOMATED SPACER PROCESSING SYSTEMS AND METHODS," the teachings of which are incorporated herein by reference.

In FIGS. 11-14, reference number 1 identifies a robotic spacer system, reference number 45 identifies an upright conveyor wall, reference number 160 identifies a spacer conveyor system, reference number 190 identifies a sealant applicator, reference number 260 identifies an overhead conveyor, reference number 261 identifies hooks, reference number 264 identifies a bottom conveyor configured to support a bottom side of a spacer 60, reference number 265 identifies a spacer conveyor line, and reference number 269 identifies spaced apart upright members. Reference is made to U.S. Pat. No. 11,536,083.

In some embodiments, an interior surface 130 of the second pane 110 bears a low-emissivity coating 70. Thus, the second subassembly operation may involve applying the spacer 60 onto an interior surface 130 that bears (over at least a central portion of its area) a low-emissivity coating 70. In such cases, it will be appreciated that the low-emissivity coating 70 may be edge deleted such that when the spacer 60 is adhered to a perimeter region of surface 130, a bead of sealant 55 bonding the spacer to surface 130 is adhered directly to the glass or other pane material defining surface 130. In some embodiments, the interior surface 130 of the second pane 110 bears a low-emissivity coating 70, and the coupling operation results in the aerogel sheet 200 being spaced apart from the spacer 60.

While the present discussion focuses on applying the spacer 60 to the second pane 110, it is to be appreciated that the spacer can alternatively be applied to the first pane. In such cases, the first subassembly operation preferably involves mounting the aerogel sheet alongside the interior surface of the second pane.

In the present third embodiment group, the coupling operation includes assembling together the first 700 and second 600 glazing subassemblies, e.g., such that the spacer 60 and the aerogel sheet 200 are located between the first 100 and second 110 panes. Thus, the coupling operation involves assembling together one pane (e.g., second pane 110) that carries a spacer 60 and another pane (e.g., first pane 100) that has an aerogel sheet 200 mounted alongside it (and which preferably does not carry a spacer).

During the coupling operation, the first 700 and second 600 glazing subassemblies are assembled together. This may involve moving the first glazing subassembly 700 toward the second glazing subassembly 600 (e.g., while holding the second glazing subassembly stationary), moving the second glazing subassembly 600 toward the first glazing subassembly 700 (e.g., while holding the first glazing subassembly stationary), or moving both the first 700 and second 600 glazing subassemblies toward each other. Reference is made to the non-limiting examples of FIGS. 16-17 and 18. Here, the first glazing subassembly 700 includes an optional perimeter mold frame 550. It is to be appreciated, however, that the perimeter mold frame 550 can be omitted (e.g., the aerogel sheet 200 can be adhered alone to the surface 120 of the first pane 100). Reference is made to the non-limiting example of FIG. 19.

In some embodiments, when the first 700 and second 600 glazing subassemblies are assembled together (whether by moving one or both subassemblies), the aerogel sheet 200 of the first glazing subassembly 700 becomes positioned interior of (e.g., so as to end-up being surrounded by) the spacer 60 of the second glazing subassembly 600. Preferably, this involves relative movement wherein the aerogel sheet 200 becomes closer to (yet still ends-up being spaced apart from) the second pane 110, and the spacer 60 becomes closer to (and ends-up being sealed to) the first pane 100, while the perimeter edge 290 of the aerogel sheet 200 is adjacent to, but remains spaced interior of, the spacer 60. During such movement, the aerogel sheet 200 may move relative to the spacer 60 so as to project into (e.g., be fitted into) an interior space bounded by the spacer. In some embodiments, this involves the aerogel sheet 200 moving closer to a low-emissivity coating 70 on the second pane 110. It is to be appreciated, however, that the low-emissivity coating 70 shown in FIGS. 16-19 can be omitted.

At the start of assembling together the first 700 and second 600 glazing subassemblies (whether by moving one or both subassemblies), the spacer 60 preferably is adhered on its second side to the second pane 110 (e.g., via a bead of sealant 55 on the spacer's second side) while having an exposed bead of sealant 55 on the spacer's first side. Reference is made to FIGS. 16 and 17. Here, the illustrated spacer 60 projects in a cantilevered fashion away from the second pane 110 during movement of one or both subassemblies 600, 700 until the bead of sealant 55 on the spacer's first side is pressed against, and thus sealed to, the first pane 100. This can also be appreciated by referring to the non-limiting examples of FIGS. 18 and 19.

In FIGS. 16 and 17, when the first 700 and second 600 glazing subassemblies are assembled together (whether by moving one or both subassemblies), the perimeter mold frame 550 of the first glazing subassembly 700 becomes positioned interior of (e.g., so as to end-up being surrounded by) the spacer 60 of the second glazing subassembly 600. Preferably, this involves relative movement wherein the perimeter mold frame 550 becomes closer to (yet still ends-up being spaced apart from) the second pane 110, and the spacer 60 becomes closer to (and ends-up being sealed to) the first pane 100, while the perimeter mold frame 550 is adjacent to, but remains spaced interior of, the spacer 60. During such movement, the perimeter mold frame 550 may move relative to the spacer 60 so as to project into (e.g., be fitted into) an interior space bounded by the spacer. In some embodiments, this involves the perimeter mold frame 550 moving closer to a low-emissivity coating 70 on the second pane 110. As noted above, however, the low-emissivity coating 70 shown in FIGS. 16 and 17 can be omitted.

Referring now to the embodiment of FIG. 18, when the first 700 and second 600 glazing subassemblies are assembled together (whether by moving one or both subassemblies), the perimeter mold frame 550 and the spacer 60 become increasingly close together (e.g., move directly toward each other) until they seal to each other (e.g., via a bead of sealant 55 on the spacer's first side). One resulting IG unit 40 of this nature is shown in the non-limiting example of FIG. 15. Here, the illustrated spacer 60 and perimeter mold frame 550 are sealed together in a side-by-side manner. In embodiments of this nature, there may be three spaced apart deposits of sealant 55, 910 (e.g., primary sealant, optionally comprising PIB) located between the two panes 100, 110. Moreover, it may be preferrable that the spacer 60 and perimeter mold frame 550 be spaced inwardly from the edges of the panes 100, 110 so as to leave a peripheral channel for filling with a secondary sealant 58 (e.g., as shown in FIGS. 6-8).

Thus, the coupling operation involves moving the first 700 and second 600 glazing subassemblies into appropriate relative alignment. The first 700 and second 600 glazing subassemblies, for example, may be moved into a relative alignment wherein their first 100 and second 110 panes are generally parallel to each other, while the two glazing subassemblies 600, 700 are spaced apart from each other. In some cases, this is done in a processing zone that is sealed for gas filling. In such cases, after suitably filling the processing zone with a thermally insulative gas (e.g., a mix of air and argon), the two glazing subassemblies 600, 700 are pressed together. Thus, in some cases, the coupling operation includes filling the between-pane space 50 with thermally insulative gas, and pressing the two subassemblies 600, 700 together so as to seal the thermally insulative gas in the between-pane space.

The coupling operation can be carried out in different ways, e.g., using two platens 52, 54 of which one or both are moveable toward the other. In some cases, such coupling is performed using the equipment and techniques disclosed in U.S. Pat. No. 11,168,515, entitled "MULTIPLE-PANE INSULATING GLAZING UNIT ASSEMBLY, GAS FILLING, AND PRESSING MACHINE," the teachings of which are incorporated herein by reference.

In embodiments where such equipment and techniques are used, a conventional flipper can optionally be used to reverse the orientation of front and back sides of the first glazing subassembly 700 before delivering such glazing subassembly into the processing station. Moreover, to the extent the first glazing subassembly 700 is conveyed after a flipper but upstream from the processing station, such conveyance may advantageously involve an air cushion configured to prevent the aerogel sheet 200 (and the perimeter mold frame 550, when provided) from contacting a rear wall of a support of the conveyor line. This may be desirable, for example, to avoid damage to the aerogel sheet 200.

Preferably, the coupling operation results in the aerogel sheet 200 being spaced apart from the spacer 60. Reference is made to the non-limiting examples of FIGS. 6-8. Additionally or alternatively, the coupling operation may result in there being a gas gap between the aerogel sheet 200 and the second pane 110. Here again, reference is made to the non-limiting examples of FIGS. 6-8. In such cases, the coupling operation preferably is performed such that the gas gap has a width in a range of from 9 mm to 14 mm, while the aerogel sheet 200 has a thickness of greater than 2 mm but less than 8 mm.

In embodiments involving a perimeter mold frame 550, the coupling operation preferably results in the perimeter mold frame either being bonded to the spacer 60 (see FIGS. 15 and 18) or being surrounded by and spaced apart inwardly from the spacer (see FIGS. 6-8, 16-17, and 19). Moreover, the first 100 of the two panes 100, 110 has a perimeter edge, and upon completing such a coupling operation, the perimeter mold frame 550 preferably is spaced inwardly from that perimeter edge by a desired distance. That distance may be, for example, in a range of from ⅛ inch to 1.5 inches, such as from ⅛ inch to 1.5 inches.

In any embodiments of the third embodiment group, the aerogel sheet 200 can have any of the dimensions noted above, such as a length of at least 1 meter.

While some preferred embodiments of the invention have been described, it should be understood that various changes, adaptations and modifications may be made therein without departing from the spirit of the invention and the scope of the appended claims.

What is claimed is:

1. A method of handling an aerogel sheet, the aerogel sheet initially being received in a mold that includes both a perimeter mold frame and a mold base such that the perimeter mold frame is disposed about a perimeter of the aerogel sheet while the mold base is under a bottom side of the aerogel sheet, the method comprising separating the aerogel sheet and the perimeter mold frame from the mold base and moving the aerogel sheet and the perimeter mold frame together as a subassembly.

2. The method of claim 1 wherein said moving the aerogel sheet and the perimeter mold frame together as a subassembly involves handling the subassembly by engaging the perimeter mold frame.

3. The method of claim 2 wherein said engaging the perimeter mold frame involves using a gripper to grip the perimeter mold frame, without the gripper contacting the aerogel sheet.

4. The method of claim 3 wherein the perimeter mold frame comprises four leg sections, and wherein said using the gripper to grip the perimeter mold frame involves the gripper simultaneously holding at least two of the four leg sections of the perimeter mold frame.

5. The method of claim 3 wherein the perimeter mold frame comprises four leg sections, and wherein said using the gripper to grip the perimeter mold frame involves the gripper simultaneously holding all four leg sections of the perimeter mold frame.

6. The method of claim 1 wherein, during said moving the aerogel sheet and the perimeter mold frame together as a subassembly, the perimeter mold frame embraces a perimeter edge of the aerogel sheet but leaves exposed a top face of the aerogel sheet and leaves exposed at least a central portion of a bottom face of the aerogel sheet.

7. The method of claim 1 wherein the perimeter mold frame is formed of stainless steel, aluminum, or polymer.

8. The method of claim 1 wherein said moving the aerogel sheet and the perimeter mold frame together as a subassembly includes placing the subassembly on a glass pane, thereby forming a glazing subassembly.

9. The method of claim 8 wherein the aerogel sheet is in a horizontal orientation when initially received in the mold, whereas the aerogel sheet is in a vertical orientation during said placing the subassembly on the glass pane.

10. The method of claim 8 further comprising performing a coupling operation by assembling the glazing subassembly together with a second glazing subassembly that comprises another glass pane and a spacer so as to form a multiple-pane insulating glazing unit in which the spacer, the aerogel sheet, and the perimeter mold frame are located between the two glass panes.

11. The method of claim 10 wherein the coupling operation results in the multiple-pane insulating glazing unit having a gas gap alongside the aerogel sheet.

12. The method of claim 1 wherein the aerogel sheet has a length of at least 1 meter.

* * * * *